US010339371B2

(12) United States Patent
Su

(10) Patent No.: US 10,339,371 B2
(45) Date of Patent: Jul. 2, 2019

(54) METHOD FOR RECOGNIZING A HUMAN MOTION, METHOD FOR RECOGNIZING A USER ACTION AND SMART TERMINAL

(71) Applicant: GOERTEK INC., Weifang (CN)

(72) Inventor: Pengcheng Su, Weifang (CN)

(73) Assignee: GOERTEK INC., Weifang (CN)

( * ) Notice: Subject to any disclaimer, the term of this patent is extended or adjusted under 35 U.S.C. 154(b) by 29 days.

(21) Appl. No.: 15/541,234

(22) PCT Filed: Sep. 9, 2016

(86) PCT No.: PCT/CN2016/098582
§ 371 (c)(1),
(2) Date: Jun. 30, 2017

(87) PCT Pub. No.: WO2017/050140
PCT Pub. Date: Mar. 30, 2017

(65) Prior Publication Data
US 2017/0357848 A1 Dec. 14, 2017

(30) Foreign Application Priority Data

Sep. 23, 2015 (CN) .......................... 2015 1 0613465
Sep. 23, 2015 (CN) .......................... 2015 1 0613543

(51) Int. Cl.
*G06K 9/00* (2006.01)
*G06F 3/01* (2006.01)
*G06K 9/62* (2006.01)

(52) U.S. Cl.
CPC .......... *G06K 9/00335* (2013.01); *G06F 3/01* (2013.01); *G06F 3/017* (2013.01); *G06K 9/0051* (2013.01);
(Continued)

(58) Field of Classification Search
CPC .......... G06K 9/00335; G06K 9/00523; G06K 9/0051; G06K 9/6228; G06K 9/6202; G06K 9/6215; G06F 3/017; G06F 3/01
See application file for complete search history.

(56) References Cited

U.S. PATENT DOCUMENTS 7,447,334 B1 * 11/2008 Jiang .................. G06K 9/00362
348/143
9,128,530 B2 * 9/2015 Yin .................... G06K 9/00355
(Continued)

FOREIGN PATENT DOCUMENTS

| CN | 101719216 A | 6/2010 |
| CN | 101995947 A | 3/2011 |

(Continued)

OTHER PUBLICATIONS

International Search Report dated Dec. 13, 2016 for PCT Application No. PCT/CN2016/098582.
(Continued)

*Primary Examiner* — Amir Alavi
(74) *Attorney, Agent, or Firm* — Moser Taboada

(57) ABSTRACT

The present disclosure provides a method for recognizing a human motion, a method for recognizing a user action and a smart terminal. The method for human motion recognition comprises: collecting human motion data to train to obtain a feature extraction parameter and a template data sequence; in one human motion recognition, collecting data for performing human motion recognition to obtain an original data sequence; using the feature extraction parameter to perform feature extraction on the original data sequence, reducing the number of data dimensions of the original data sequence, and obtaining a test data sequence after the dimension reduction; matching the test data sequence with the template data sequence, and confirming that a human motion corresponding to the template data sequence associated with the (Continued)

test data sequence occurs when a successfully-matched test data sequence exists. By performing dimension reduction on the test data sequence, the present disclosure lowers requirements for human motion postures and cancels noise, then matches the data after the dimension reduction with the template, realizes accurate recognition of human motions while reducing the computing complexity, and improves the user experience.

14 Claims, 5 Drawing Sheets

(52) U.S. Cl.
CPC ....... *G06K 9/00523* (2013.01); *G06K 9/6202* (2013.01); *G06K 9/6215* (2013.01); *G06K 9/6228* (2013.01)

(56) References Cited

U.S. PATENT DOCUMENTS

| | | | | |
|---|---|---|---|---|
| 2007/0104373 | A1* | 5/2007 | Liao | G06K 9/00369 382/190 |
| 2011/0025834 | A1* | 2/2011 | Chen | H04N 7/18 348/77 |
| 2011/0071417 | A1 | 3/2011 | Liu et al. | |
| 2013/0343610 | A1 | 12/2013 | Dal Mutto et al. | |
| 2014/0257743 | A1 | 9/2014 | Lokshin et al. | |
| 2016/0377704 | A1* | 12/2016 | Harash | G01S 7/411 342/21 |
| 2016/0379462 | A1* | 12/2016 | Zack | G08B 21/043 340/539.12 |
| 2017/0357848 | A1* | 12/2017 | Su | G06F 3/01 |
| 2018/0088679 | A1* | 3/2018 | Dai | G06F 3/017 |
| 2018/0249072 | A1* | 8/2018 | Li | G06K 9/00362 |

FOREIGN PATENT DOCUMENTS

| | | |
|---|---|---|
| CN | 102136066 A | 7/2011 |
| CN | 103472917 A | 12/2013 |
| CN | 103543826 A | 1/2014 |
| CN | 104038738 A | 9/2014 |
| CN | 104182411 A | 12/2014 |
| CN | 104484644 A | 4/2015 |
| CN | 104834907 A | 8/2015 |
| CN | 105184325 A | 12/2015 |
| CN | 105242779 A | 1/2016 |

OTHER PUBLICATIONS

International Search Report and Written Opinion dated Dec. 13, 2016 for PCT Application No. PCT/CN2016098582.
Hou et al., "Acceleration-Based Activity Recognition Independent of Device Orientation and Placement", College of Computer Science and Technology, Zhejiang University, vol. 41, Issue 10, pp. 76-79, Oct. 2014.
Chinese Office Action dated Oct. 20, 2017 for Application No. 201510613465.9.
China Patent Application No. 201510613543.5 First Office Action dated Feb. 6, 2018.

* cited by examiner

METHOD FOR RECOGNIZING A HUMAN MOTION, METHOD FOR RECOGNIZING A USER ACTION AND SMART TERMINAL

TECHNICAL FIELD

The present disclosure relates to the technical field of action recognition in human-machine interaction, and specifically to a method for recognizing a human motion, a method for recognizing a user action and a smart terminal.

BACKGROUND

At present, gesture recognition schemes in a human-machine interaction system are mainly classified into two types: vision-based scheme and sensor-based scheme. Research on the vision-based gesture recognition gets started earlier, the recognizing method is also relatively mature, but this scheme has drawbacks such as sensitivity to environment, complicated system and a large computing amount. The sensor-based gesture recognition gets started later, but it is flexible and reliable, free from influence from environment and light, and easy to implement, and is a recognition method with a development potential. The essence of gesture recognition is to use a gesture recognition algorithm to classify gestures according to a gesture model. Good or bad gesture recognition algorithm directly affect efficiency and precision of the gesture recognition.

Current gesture recognition algorithms mainly comprise the following types:

(1) DTW (Dynamic Time Warping). Although the DTW algorithm can solve the problem about inconsistency of length of an input data sequence and a template data sequence, its matching performance substantially depends on users;

(2) HMM (Hidden Markov Model). Due to users' individual differences, the same gesture action exhibits larger differences, and it is difficult to build an accurate gesture action model and a Hidden Markov Model. Furthermore, and the Hidden Markov Model is too complicated upon analyzing the gesture action so that the computing amount for training and recognition is larger;

(3) Artificial neural network. The artificial neural network recognition algorithm needs a lot of training data, and the algorithm is very complicated.

Hence, application of the current sensor-based recognition scheme to the smart terminal is still confronted with many problems to be solved, for example:

(1) How to achieve higher-precision recognition based on the sensor.

(2) How to reduce complexity in recognition computing. Since the smart terminal is a device with limited resources, and constant sensing of the smart terminal needs to consume much energy during gesture recognition, so the gesture recognition of the smart terminal needs to take computing amount and power consumption into account.

(3) The prior art generally requires operations to be performed on a given smart terminal posture or a fixed plane, limits a scope of user's actions, and imposes higher requirements for apparatus posture. This causes extreme inconvenience to the user's use and produces undesirable user experience.

SUMMARY

The present disclosure provides a method for recognizing a human motion, a method for recognizing a user action and a smart terminal, to solve or partially solve the above technical problems, improve human motion recognition precision, lower computing complexity and optimize user experience.

To achieve the above object, the technical solutions of the present disclosure are implemented as follows:

According to one aspect of the present disclosure, there is provided a method for recognizing human motion, collecting human motion data to train to obtain a feature extraction parameter and a template data sequence, the method further comprising:

in one human motion recognition, collecting data needed for performing human motion recognition to obtain an original data sequence;

using the feature extraction parameter to perform feature extraction on the original data sequence, reducing the number of data dimensions of the original data sequence, and obtaining a test data sequence after the dimension reduction;

matching the test data sequence with the template data sequence, and confirming that a human motion corresponding to the template data sequence associated with the test data sequence occurs when a successfully-matched test data sequence exists.

According to one aspect of the present disclosure, there is provided a smart terminal, comprising a parameter obtaining unit, a data collecting unit, a dimension reduction unit and a matching unit;

the parameter obtaining unit is configured to obtain a feature extraction parameter and a template data sequence;

the data collecting unit is configured to collect data needed for performing human motion recognition, to obtain an original data sequence;

the dimension reduction unit is configured to use the feature extraction parameter obtained by the parameter obtaining unit to perform feature extraction on the original data sequence, reduce the number of data dimensions of the original data sequence, and obtain a test data sequence after the dimension reduction;

the matching unit is configured to match the test data sequence with the template data sequence obtained by the parameter obtaining unit, and confirm that a human motion corresponding to the template data sequence associated with the test data sequence occurs when a successfully-matched test data sequence exists.

According to a further aspect of the present disclosure, there is provided a method for recognizing user action, obtaining user action data, training the user action data, and obtaining a feature extraction parameter and a template symbol sequence, the method further comprising:

in one user action recognition, collecting data needed for performing user action recognition to obtain an original data sequence;

using the feature extraction parameter to perform feature extraction on the original data sequence, reducing the number of data dimensions of the original data sequence, and obtaining a test data sequence after the dimension reduction;

converting the test data sequence into a discrete character string, and obtaining a symbol sequence of the test data sequence;

matching the symbol sequence of the test data sequence with a template symbol sequence, and confirming that a user action corresponding to the template symbol sequence occurs when the matching is successful.

According to a further aspect of the present disclosure, there is provided a smart terminal, comprising a parameter obtaining unit, a data collecting unit, a dimension reduction processing unit, a symbolizing unit and a matching unit;

the parameter obtaining unit is configured to obtain a feature extraction parameter and a template symbol sequence;

the data collecting unit is configured to, in one user action recognition, collect data needed to execute user action recognition to obtain an original data sequence;

the dimension reduction processing unit is configured to use the feature extraction parameter obtained by the parameter obtaining unit to perform feature extraction on the original data sequence, reduce the number of data dimensions of the original data sequence, and obtain a test data sequence after the dimension reduction;

the symbolizing unit is configured to convert the test data sequence into a discrete character string and obtain a symbol sequence of the test data sequence;

the matching unit is configured to match the symbol sequence of the test data sequence with a template symbol sequence obtained by the parameter obtaining unit, and confirm that a user action corresponding to the template symbol sequence occurs when the matching is successful.

Advantageous effects of the present disclosure are as follows: according to the human motion recognition solution and user action recognition solution provided by the embodiments of the present disclosure, the feature extraction parameter and template data sequence (or template symbol sequence) are obtained through training in advance, and the feature extraction parameter is used to perform dimension reduction for the test data sequence collected upon one time of collection, for example, reduce the original three-dimensional acceleration signal to one dimension. As compared with a solution of directly operating on the three-dimensional data respectively in the prior art, the solution in the present disclosure greatly reduces the computing complexity; furthermore, since the three-dimensional data is converted into one-dimensional data, the solution of the present disclosure can also cancel noise, reduce requirements for equipment postures when the user sends a gesture instruction, and permit the user to execute the gesture action more flexibly, and improve the user's experience. Experiments prove that the solutions of the present embodiment, as compared with the prior art, can accurately recognize the user's human motions such as hand lift and wrist turning, exhibit a high recognition precision, without imposing rigid requirements for the user action posture and a position of a starting point, enable users to execute actions more casually, and exhibit a better user experience.

In addition, the smart terminal provided by the embodiments of the present disclosure reduces the number of data dimensions during the human motion recognition and the user action recognition so that the computing amount is smaller, the power consumption is lower, and operation and recognition can be done in real time in the smart terminal device, thereby better satisfying needs in practical application, and improving the competitiveness of the mobile smart terminal according to the embodiments of the present disclosure.

DETAILED DESCRIPTION

Embodiments of the present disclosure will be further described in detail with reference to figures to make objectives, technical solutions and advantages of the present disclosure more apparent.

A main concept of embodiments of the present disclosure is as follows: with respect to problems in the prior sensor-based human motion recognition scheme, in embodiments of the present disclosure, it is feasible to pre-collect human motion data for training to obtain a feature extraction parameter and a template data sequence (or a template symbol sequence), and use the feature extraction parameter to reduce the number of data dimensions of a test data sequence. As compared with a prior solution of directly operating on collected high-dimensional data to recognize human motions, the present disclosure lowers requirements for equipment postures upon executing human motion recognition, cancels noise, and matches the data sequence after the dimension reduction with the template data sequence, and can realize accurate recognition of human motions (or user actions) while reducing computing complexity.

Embodiment 1

Figure 1:
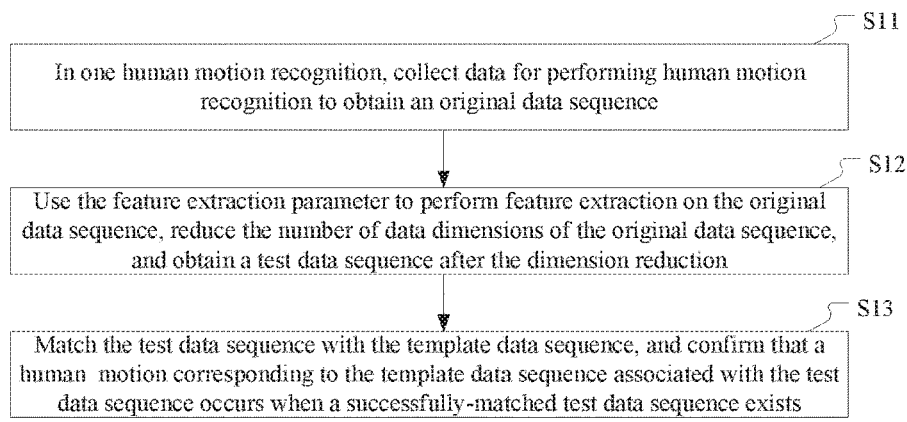
FIG. 1 is a flow chart of a method for recognizing a human motion according to an embodiment of the present disclosure.

The method for recognizing a human motion according to the embodiment of the present disclosure may be applied to a mobile smart terminal. FIG. 1 is a flow chart of a method for recognizing a human motion according to an embodiment of the present disclosure. Referring to FIG. 1, in any one human motion recognition, the method comprises the following steps S11-S13:

Step S11: collecting data needed for performing human motion recognition to obtain an original data sequence;

Before performing the human motion recognition, the present embodiment further comprises a template training procedure in which human motion data is collected for training to obtain a feature extraction parameter and a template data sequence. The template training procedure is not a requisite operation every time before performing the human motion recognition, for example, it is feasible to, before performing all human motion recognition, obtain the feature extraction parameter and template data sequence through one template training procedure and use them in all subsequent human motion recognition.

Step S12: using the feature extraction parameter to perform feature extraction on an original data sequence, reducing the number of data dimensions of the original data sequence, and obtaining a test data sequence after the dimension reduction;

Step S13: matching the test data sequence with the template data sequence, and confirming that a human motion corresponding to the template data sequence associated with the test data sequence occurs when a successfully-matched test data sequence exists.

According to the method shown in FIG. 1, in one time of human motion recognition, the number of data dimensions is reduced for the collected original data sequence by using the pre-acquired feature extraction parameter, thereby reducing the high-dimension original data sequence to a low dimension (specifically to one dimension), reducing the computing complexity of human motion recognition method, saving the power consumption of the system, ensuring an efficiency of human motion recognition, cancelling noise, and thereby reducing limitations and requirements for postures upon performing human motion recognition, and improving the user's experience in use. Furthermore, the precision of the human motion recognition is ensured by matching the test data sequence after the dimension reduction with the pre-acquired template data sequence, and confirming occurrence of the human motion corresponding to the template upon successful matching.

Embodiment 2

Figure 2:
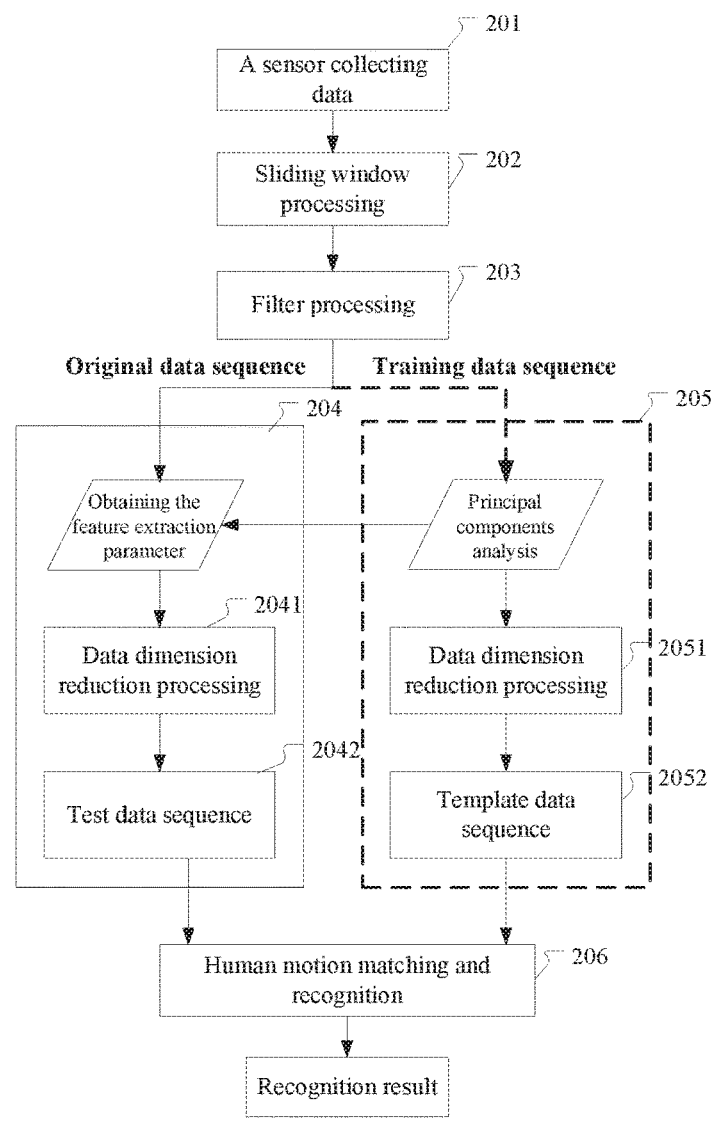
FIG. 2 is a flow chart of a method for recognizing a human motion according to another embodiment of the present disclosure.

FIG. 2 is a flow chart of a method for recognizing a human motion recognition according to another embodiment of the present disclosure; referring to FIG. 2, in the present embodiment, pre-training is performed to obtain one or more template data sequence(s), each template data sequence corresponds to a human motion (e.g., a template data sequence corresponds to the user's action of lifting a hand, and another template data sequence corresponds to the user's action of turning wrist), the template data sequence is stored, and the template data sequence may be directly used in subsequent test without need to train again.

Referring to FIG. 2, the template training comprises the following steps: a sensor collecting data; sliding window processing; filtering processing; step 205: training data sequence processing (specifically comprising step 2051 of using principal components analysis to perform data dimension reduction processing on the training data sequence, and step 2052 of obtaining the template data sequence).

The testing procedure comprises the following steps: step 201: a sensor collecting data; step 202: sliding window processing; step 203: filter processing; step 204: original data sequence processing (specifically comprising step 2041 of performing data dimension reduction processing on the training data sequence by using a feature extraction parameter obtained from the principal components analysis, and step 2042 of obtaining the test data sequence), and step 206: performing human motion matching and recognition.

It needs to be appreciated that the sensor collecting data, sliding window processing and the filter processing in the template training respectively correspond to step 201, step 202 and step 203 in the testing procedure, and any two thereof are performed with substantially the same operation, so FIG. 2 simultaneously shows step 204 and step 205 to clearly illustrate the two procedures: template training and human motion recognition.

The flow of such method for recognizing a human motion according to an embodiment of the present disclosure is illustrated below by taking one human motion recognition test as an example.

Referring to FIG. 2, the onetime of human motion recognition procedure according to the present embodiment comprises:

Step 201: a sensor collecting data;

Use the sensor to collect three-axis acceleration data and/or three-axis angular speed data, and store the collected three-axis acceleration data and/or three-axis angular speed data respectively in a corresponding annular buffer area;

The sensor here may be a three-axis acceleration sensor or three-axis gyro sensor. The sensor collects human motion data. The collected data is three-axis acceleration or three-axis angular speed in X axis, Y axis and Z axis of the human motion. The collected data is respectively stored in an annular buffer area with a length Len.

Figure 3:
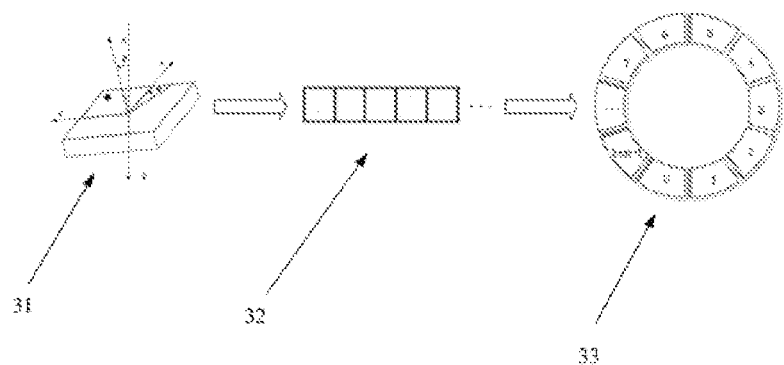
FIG. 3 is a schematic diagram of data collection according to a further embodiment of the present disclosure.

FIG. 3 is a schematic diagram of data collection according to a further embodiment of the present disclosure. Referring to FIG. 3, the reference number 31 denotes a three-axis acceleration sensor, 32 denotes acceleration data obtained from collection, and 33 denotes an annular buffer area; the three-axis acceleration sensor 31 collects the three-axis acceleration data 32 of the human motion, and the collected three-axis acceleration data 32 is placed in the corresponding annular buffer area 33 (FIG. 3 shows the annular buffer area 33). The design of the annular buffer area 33 employed by the present embodiment may save storage space of the system, and facilitates subsequently performing sampling and siding window addition processing on the collected acceleration data. Those skilled in the art can understand that it is feasible not to place the collected acceleration data 32 in the annular buffer area 33 in other embodiments of the present disclosure. This is not limited in the present disclosure.

In addition, emphatically, FIG. 3 illustrates by taking the acceleration sensor collecting the three-axis acceleration of the human motion as an example, and subsequently, the training, the dimension reduction for the test data and the matching operation are carried out with the three-axis acceleration data being taken as an example. However, in other embodiments of the present disclosure, it is also feasible to collect the three-axis angular speed data of the human motion via a gyro sensor, or collect the three-axis acceleration data via the acceleration sensor and collect the three-axis angular speed data via the gyro sensor, then train the acceleration data sequence and angular speed data sequence respectively to obtain the template data sequence corresponding to the acceleration data sequence and the template data sequence corresponding to the angular data. This is not limited in the present disclosure. Likewise, if the three-axis angular speed data is collected or both the acceleration data and angular speed data are collected, then the angular speed data needs to be collected upon testing; or both the acceleration data and the angular speed data are collected, and corresponding data sequences after the processing are respectively matched with corresponding templates to determine whether the matching is successful. Furthermore, when the acceleration data and the angular speed data of the human motion are collected, it is feasible to design different weights respectively for the matching results of the acceleration data sequence and angular speed data sequence with their templates, for example, design a larger weight for the matching result of the angular speed data sequence, and take the weighted matching result as a judgment result of the test data sequence.

It needs to be appreciated that the step of the sensor collecting data upon template training is substantially identical with the step of the sensor collecting data during human motion recognition testing procedure, and a main difference lies in that data needs to be collected for multiple times for the same human motion upon template training, whereas data of any one human motion that actually happens is collected when the human motion recognition is executed. Hence, the sensor collecting data in template training can refer to the above related depictions, which will not be detailed here.

Step 202: sliding widow processing;

After the three-axis acceleration data is collected, sliding windows are added respectively to the three-axis acceleration data retrieved from three annular buffer areas. That is, sampling is performed simultaneously from the annular buffer areas according to a predetermined frequency, and window-adding processing is performed on the sampled data with sliding widows with a predetermined step to obtain original data sequences with a predetermined length.

Figure 4:
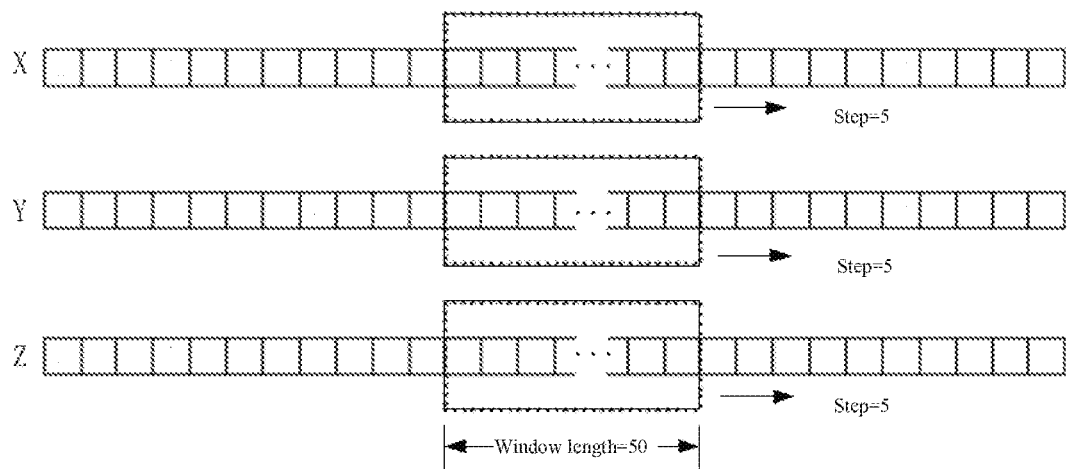
FIG. 4 is schematic diagram of sliding window-adding processing according to a further embodiment of the present disclosure.

FIG. 4 is schematic diagram of sliding window-adding processing according to a further embodiment of the present disclosure; as shown in FIG. 4, sampling is performed according to a predetermined frequency from the annular buffer areas of X-axis, Y-axis and Z-axis three-axis acceleration data, and window-adding processing is performed for the sampled data. In the present embodiment, the sampling frequency is 50 Hz (50 pieces of data are obtained by sampling in one minute), the size of each sliding window is 50 pieces of sampled data, and a movement step of the sliding window is 5 pieces of sampled data. The size of the sliding window is a length of the obtained original data sequence, that is to say, each time 50 pieces of sampled data are taken out simultaneously respectively from the X-axis, Y-axis and Z-axis three-axis annular buffer areas for testing recognition.

Noticeably, a window function employed in the window-adding processing in the present embodiment is a rectangular window, and the rectangular window belongs to a window of a time variable to the power of zero. The window function in other embodiments of the present disclosure is not limited to the rectangular window, and may employ other window functions. The window function is not limited.

In addition, the sliding window processing procedure upon template training is substantially identical with the sliding window processing step 202 in the course of one human motion recognition test, so the sliding window processing in the template training can refer to the above related description.

Step 203: filter processing;

Perform filter processing on an original data sequence with a predetermined length obtained after the window is added to filter out interference noise.

In the present embodiment, the performing filter processing on an original data sequence having a predetermined length to filter out interference noise comprises: for a data point to be filtered in each axial direction of the original data sequence having the predetermined length, selecting a predetermined number of data points adjacent to a left side of the data point and selecting a predetermined number of data points adjacent to a right side of the data point, and calculating an average value of selected data points, and replacing a value of the data point to be filtered with the average value.

Specifically, the present embodiment performs filter processing by employing K time nearest neighbor mean filtering. The K time nearest neighbor mean filtering employs pre-setting the number K of time nearest neighbors, then among acceleration data time sequences of respective axes, taking a mean value of a sequence formed by K nearest neighbor data points on the left of any data point and K nearest neighbor data points on the right as the value of the data point after the filter processing. Special processing needs to be done for the first K data points and the last K data points in the time sequence, and as many as neighbor data points are taken as objects for mean processing.

The X-axis data sequence in the three-axis acceleration data is taken as an example. K time nearest neighbor mean filtering formula is as follows:

$$a'_{xi} = \begin{cases} \dfrac{1}{i+K} \sum_{j=1}^{i+K} a_{xj} & i \leq K \\ \dfrac{1}{N-i+K+1} \sum_{j=i-K}^{N} a_{xj} & i \geq N-K+1 \\ \dfrac{1}{2K+1} \sum_{j=i-K}^{i+K} a_{xj} & K < i < N-K+1 \end{cases}$$

N Wherein is a length of X-axis data sequence, namely a size of the sliding window (the length of the data sequence in the present embodiment is 50), K is the number of pre-selected neighbors, namely, the number of nearest neighbors on the left and right of a certain data point, $a_{xj}$ is a component of an acceleration signal $a_j$ on the X axis, and $a'_{xi}$ is data corresponding to $a_{xj}$ after the filtering.

It needs to be appreciated that in other embodiments of the present disclosure, other filter processing methods such as median filtering or Butterworth filtering besides K time nearest neighbor mean filtering may be employed so long as they can implement filter processing on the original data sequence. This is not limited in the present disclosure.

In addition, the filter processing procedure upon template training is substantially identical with the filter processing step 203 in one human motion recognition testing procedure, so the filter processing in template training may refer to the above relevant depictions.

Step 204: processing the original data sequence comprises: obtaining a feature extraction parameter and executing step 2041 of performing data dimension reduction processing, according to the feature extraction parameter; executing step 2042 after the processing of step 2041, and calculating to obtain the test data sequence. Illustration is presented respectively below.

Step 2041: performing data dimension reduction processing

In the present embodiment, the feature extraction parameters upon performing data dimension reduction processing comprises the following three: each axial mean value and a standard deviation vector of a training data sequence corresponding to the template data sequence, and a conversion matrix for performing data dimension reduction processing.

Specifically, the feature extraction parameter and template data sequence obtained from training may be stored during template training, and the feature extraction parameters in step 2041 of performing data dimension reduction processing are obtained upon using principal components analysis to train the training data sequence in step 205 of template training procedure. The training data sequence processing in step 205 is using principal components analysis to perform the step 2051 of performing data dimension reduction processing.

The principal components analysis PCA (Principal Components Analysis) here means managing to re-combine many (e.g., P) original indices having certain relevancy into a group of new irrelevant comprehensive indices to replace original indices. PCA reveals internal structure between a plurality of variables through a few of principal components, namely, derives a few of principal components from original variables and ensures that they retain information of the original variables as much as possible and they are irrelevant to one another.

The principle of the principal components analysis PCA is: suppose that $F_1$ indicates principal components indices formed by a first linear combination of original variables $A_1$, $A_2, \ldots A_P$, information amount extracted by each principal component may be measured by the variance thereof; the larger the variance Var ($F_1$), the more the information of the original index included by $F_1$. Hence, $F_1$ selected from all linear combinations should has the largest variance among all linear combinations of multiple variables, so $F_1$ is called the first principal component. If the first principal component is not sufficient to represent information of original multiple indices, then the second principal component index $F_2$ is selected, and $F_1, F_2, \ldots F_P$ constructed in a similar way are the first, the second, . . . the $P^{th}$ principal component of principal component indices $A_1, A_2, \ldots A_P$ of original variables. These principal components are irrelevant and their variances decrease progressively.

In the present embodiment, use principal components analysis to select several first principal components to process the training data sequence (without need to process all indices) implements feature extraction for the training data sequence. This specifically comprises operations in step 1 to step 3:

Step 1: filtering each collected training data sequence, and performing normalization processing on the training data sequence after the filtering;

In the present embodiment, before performing the principal components analysis PCA processing, normalization processing needs to be performed on the training data sequence to convert it into a data sequence with a mean value 0 and a variance 1.

Specifically, suppose that N×P matrix formed by the three-axis acceleration training data obtained from three sliding windows is $A=[A_1, \ldots A_P]$, wherein N is a length of the sliding window, and P is the number of dimensions of data. In the present embodiment, P=3, namely, the training data sequence is three-dimensional data, and elements in matrix A are represented as $a_{ij}$, i=1, . . . N; j=1, . . . P.

Step 2: calculating all feature values of a covariance matrix of the training data sequence and a unit feature vector corresponding to each feature value. Step 2 specifically comprises step 21 and step 22;

Step 21: calculating a covariance matrix;

Calculating axial mean values $M=\{M_{ax}, M_{ay}, M_{az}\}$ of the three-axis acceleration training data sequence, and a standard deviation vector $\sigma=\{\sigma_{ax}, \sigma_{ay}, \sigma_{az}\}$; a method of calculating each axial mean value and the standard deviation vector is of common knowledge and will not be detailed here.

Calculating a covariance matrix $\Sigma$ of matrix A formed by the training data sequence, namely $\Sigma=(s_{ij})_{P \times P}$, wherein $$S_{ij} = \frac{1}{N-1}\sum_{k=1}^{N}(a_{ki}-\overline{a_i})(a_{kj}-\overline{a_j})$$

$\overline{a}_i$ and $\overline{a}_j$ are respectively a mean value of $a_{ki}$ and $a_{kj}$ (k=1, 2, . . . , N), namely, calculate each axial mean value of the three-axis acceleration training data, i=1, . . . P; j=1, . . . P. In the present embodiment, N is 50, and P=3;

Step 22: solving a feature value $\lambda_i$ of the covariance matrix and a $\Sigma$ and a corresponding unit feature vector $u_i$;

Suppose the feature values of the covariance matrix $\Sigma$ satisfy $\lambda_1 \geq \lambda_2 \geq \ldots \geq \lambda_P > 0$, the corresponding unit feature vector is $u_1, u_2, \ldots, u_P$. The principal components of $A_1$, $A_2, \ldots A_P$ are a linear combination with the feature vector of the covariance matrix $\Sigma$ being a coefficient, they are irrelevant to one another and their variances are the feature values of $\Sigma$.

Suppose that the three-axis acceleration training data collected at certain time is $a=\{a_x, a_y, a_z\}$, the unit feature vector $u_i=\{u_{i1}, u_{i2}, u_{i3}\}$ corresponding to $\lambda_i$ is a combined coefficient of the principal components with respect to the acceleration training data a, and the $i^{th}$ principal component $F_i$ of the three-axis acceleration training data sequence is:

$$F_i = a \cdot u_i = a_x u_{i1} + a_y u_{i2} + a_z u_{i3}$$

In the present embodiment, for example, the feature values of the covariance matrix of the training data sequence are obtained as {2.7799, 0.2071, 0.0130} through calculation.

Step 3: selecting an optimal feature value from feature values; namely, selecting a principal component.

The first m principal components are selected to represent information of original variables, and m is determined by a variance information accumulative contribution rate G(m):

$$G(m) = \sum_{i=1}^{m} \lambda_i \bigg/ \sum_{k=1}^{P} \lambda_k$$

In the present embodiment, P=3. The processing procedure of the step is in accordance with the principal component, namely, feature value $\lambda_i$ obtained in the previous step through calculation. Specifically, in the present embodiment, selecting several features values to better represent the information of the three-axis acceleration training data sequence is determined by calculating the variance information accumulative contribution rate of each feature value. In the present embodiment, when the variance information accumulative contribution rate G(m) is greater than 85%, it is judged sufficient to reflect the information of the three-axis acceleration training data sequence. At this time, the corresponding m is the number of the first several principal components to be extracted. For example, when m is 2, the first two principal components are extracted.

The variance information accumulative contribution rate is calculated when one principal component (namely, feature value) is selected. If the variance information accumulative contribution rate of the first principal component is greater than 85%, it is feasible to only select the first principal component. If the variance information accumulative contribution rate when the first principal component is selected is less than or equal to 85%, the second principal component needs to be calculated, and calculation is performed to see whether the variance information accumulative contribution rate when two principal components (namely, the first principal component and the second principal component) are selected is greater than 85%, and so on so forth, to determine the value of m, namely, determine the number of the selected principal components.

In the present embodiment, for example, the variance information accumulative contribution rate of the first principal component is calculated as 92.66% (greater than 85%), so the information of the original variables is retained very well by only selecting the first principal component (i.e., selecting one optimal feature value from three feature values).

In addition, a current solution may be employed to calculate and select the principal components through the principal components analysis. Reference may be made to the disclosure in the prior art about selection of principal components through principal components analysis for more detailed principles and calculating steps, which will not be detailed here.

Step 2051: performing data dimension reduction processing

Perform dimension reduction processing on the training data sequence by using a conversion matrix constituted by a unit feature vector corresponding to an optimal feature value, and calculate mapping of the training data sequence on the conversion matrix to obtain the training data sequence after dimension reduction.

As core of the three-axis acceleration training data sequence on the first principal component (feature value), namely, projection F1 on the first principal component, is calculated though the following formula:

$$F_1 = a \cdot u_1 = a_x u_{11} + a_y u_{12} + a_z u_{13}$$

In this way, the 3-dimensional acceleration training data sequence is reduced to one-dimensional data, wherein $u_1 = \{u_{11}, u_{12}, u_{13}\}$ is a conversion matrix of the feature extraction parameter obtained from training, namely, the unit feature vector corresponding to the first principal component (feature value).

It needs to be emphasized that in actual application, the one-dimensional data after the dimension reduction may be regarded as one training data sequence. Or, furthermore, the one-dimensional data sequence is framed, an average value of each frame is solved, and then the data sequence formed by the average value of each frame is regarded as one training data sequence. The so doing can further cancel noise, improve robustness of the system. This is not limited in the present disclosure.

Step 2052: template data sequence;

Respectively calculate distances between each training data sequence and other training data sequences after dimension reduction, average all distances of each training data sequence, select a minimum value from the average distances obtained from each training data sequence, and take the training data sequence where the minimum value lies as a template data sequence corresponding to the human motion.

In the present embodiment, data are collected for multiple times for the same human motion to obtain a plurality of training data sequences;

Principal components analysis is used to perform feature extraction on each training data sequence, the number of data dimensions of the training data sequence is reduced to obtain training data sequence after dimension reduction, and a template data sequence corresponding to the human motion is determined according to the distances between training data sequences after dimension reduction.

When training the training data sequence, a standard human motion is collected for N times, and N training data sequences are obtained after the above processing steps, and distances between each training data sequence and other N−1 training data sequences are calculated respectively, and the distances are averaged. Finally, N average distances are obtained, a minimum is selected from N average distances, and the training data sequence where the minimum average distance lies is stored as a template data sequence corresponding to the human motion, for subsequent use when the human motion recognition is actually executed.

In addition, after the template data sequence is determined, respective axial mean values and standard deviation vector of the corresponding three-axis acceleration training data sequence during the template data sequence training are also stored as feature extraction parameters.

In step 205, principal components analysis is used to process the training data sequence to obtain the feature extraction parameter, the feature extraction parameter is output to step 204 so that in step 2041, the obtained feature extraction parameter may be directly used to perform data dimension reduction processing on the original data sequence after the filter processing.

Specifically, in step 2041, the following operations are performed on the original data sequence after the filter processing by using the axial mean values $M = \{M_{ax}, M_{ay}, M_{az}\}$ and standard deviation vector $\sigma = \{\sigma_{ax}, \sigma_{ay}, \sigma_{az}\}$ of the training data sequence corresponding to the obtained template data sequence, and the conversion matrix $u = \{u_{11}, u_{12}, u_{13}\}$:

Using each axial mean value and standard deviation vector of the training data sequence to perform normalization processing on the original data sequence;

In three sliding windows, using the feature extraction parameters to perform normalization processing for X-axis, Y-axis and Z-axis acceleration data:

$$a'_x = (a_x - M_{ax})/\sigma_{ax}$$

$$a'_y = (a_y - M_{ay})/\sigma_{ay}$$

$$a'_z = (a_z - M_{az})/\sigma_{az}$$

$a_x$, $a_y$, $a_z$ are respectively the acceleration data on X axis, Y axis and Z axis before the normalization processing, and $a_x'$, $a_y'$, $a_z'$ are respectively corresponding data after normalization processing is performed for $a_x$, $a_y$, $a_z$.

The conversion matrix is used to perform feature extraction on the original data sequence after the normalization processing, reduce the number of data dimensions of the original data sequence and obtain test data sequence of the original data sequence after dimension reduction is performed.

Step 2042: test data sequence

Multiplying the original data sequence after normalization by the conversion matrix u to obtain one-dimension test data sequence after dimension reduction:

$$d = a' \cdot U = a'_x u_{11} + a'_y u_{12} + a'_z u_{13}$$

namely, obtain one-dimension test data sequence corresponding to the original data sequence. Furthermore, the one-dimensional data sequence may be framed, an average value of each frame is solved, and then the data sequence formed by each average value is regarded as one-dimension test data sequence corresponding to the original data sequence. Specifically, whether to frame is determined according to whether the template data sequence during the template training is framed. A length of the training data sequence obtained here should remain consistent with a length of the aforesaid template data sequence.

Step 206: human motion matching and recognition

In the present embodiment, the template matching is employed to perform human recognition. The template matching means matching the test data sequence obtained after the processing with a pre-stored template data sequence, and completing a recognition task by measuring similarity (namely, distance) between two data sequences. If a distance therebetween is smaller than a given threshold, it is believed that the test data sequence successfully matches with the template data sequence, and the human motion corresponding to the template data sequence occurs.

Specifically, for example, the template data sequence obtained after the aforesaid training processing is $A=a_1, a_2, \ldots, a_N$, and the test data sequence is $D=d_1, d_2, \ldots, d_N$. The distance between the two data sequences is calculated through a distance function DIST. A calculating formula is as follows:

$$DIST(D, A) = \sqrt{\sum_{i=1}^{N} (d_i - a_i)^2}$$

Wherein, A is the template data sequence, $a_i$ represents the $i^{th}$ element in the template data sequence, D is the test data sequence, $d_i$ represents the $i^{th}$ element in the test data sequence, N is a length of the template data sequence and a length of the test data sequence, and DIST(D,A) represents calculation of a distance between D and A.

After the distance between the test data sequence and the template data sequence is obtained, if the distance is smaller than a preset threshold, it is believed that the test data sequence successfully matches with the template data sequence, and the human motion corresponding to the template data sequence occurs.

Recognition Result.

A corresponding recognition result may be obtained according to step 206 so as to judge whether the collected data sequence corresponds to a valid human motion. When the collected data sequence corresponds to one human motion, it is feasible to further recognize which template matches the human motion, namely, this can achieve an effect of recognizing a specific human motion.

The above describes the flow of the method for recognizing a human motion according to an embodiment of the present disclosure. The principal components analysis is used for training to obtain the feature extraction parameter and template data sequence, then the feature extraction parameter is used to perform data dimension reduction for the collected original data sequence to reduce the high-dimensional original data sequence to one-dimension data sequence, thereby reducing the computing complexity, canceling noise, reducing equipment posture requirements for the human motion recognition, and improving the user's experience in use; then, the test data sequence after the dimension reduction is matched with the template data sequence, and occurrence of the human motion corresponding to the template is confirmed upon successful matching, thereby ensuring accuracy of the human motion recognition, and realizing an advantageous effect of improving the human motion recognition efficiency and ensuring the recognition precision.

Embodiment 3

In a further embodiment of the present disclosure, when the human motion recognition is performed and after the original data sequence of a predetermined length is collected, the technical solution of the present embodiment further comprises performing screening operation on the original data sequence to reduce a mistrigger error rate. That is to say, before data dimension reduction is performed for the original data sequence, first judgment is performed as to whether the original data sequence is a valid original data sequence, to further improve human motion recognition efficiency and reduce system power consumption.

Specifically, one or more type of the following measures are taken to ensure what is recognized is a real human motion to be recognized, and minimize the mistrigger rate. In addition, reference may be made to depictions in other embodiments for relevant content not described in the present embodiment.

Measure 1: Mean Value Judgment

Such mistrigger-preventing measure is based on the following principle: for a real human motion to be recognized, respective axial mean values of the three-axis acceleration data have corresponding possible ranges of values; if the respective axial mean values obtained from calculation go beyond preset possible ranges of values, the human motion may be judged not as the real human motion to be recognized, but mistrigger.

Such mistrigger-preventing measure comprises two specific implementation modes:

One specific implementation mode is to respectively calculate mean values $M_x$, $M_y$, $M_z$ of all acceleration data in the aforesaid three sliding windows, and compare the mean values $M_x$, $M_y$, $M_z$ with respective range of values to judge whether it is the real human motion to be recognized;

Specifically, in each sliding window with a length N (e.g., N is 50), respective axial mean values $M_x$, $M_y$, $M_z$ of the three-axis acceleration data are calculated. This mode requires respectively calculating mean values of all data in respective axial directions, then judging whether $M_x$, $M_y$, $M_z$ fall within corresponding ranges in each sliding window, taking it not as a human motion if they go beyond the ranges, and directly returning without performing further processing. That is, each axial mean value corresponds to a possible range of values, and respective axial mean values obtained by calculating according to an original data sequence are compared with respective ranges of values.

The other specific implementation mode is respectively calculating mean values $EndM_x$, $EndM_y$, $EndM_z$ of a latter predetermined number of data points in three sliding windows:

As for a real user action to be recognized, for example, a hand-lifting action, mean values $EndM_x$, $EndM_y$, $EndM_z$ of acceleration data at end points of three axial directions (namely, a position represented by a latter predetermined number of data points in each sliding window) also have corresponding possible ranges of values. Judge whether $EndM_x$, $EndM_y$, $EndM_z$ fall within respective ranges in each sliding window, take it not as a real human motion to be recognized if they go beyond the ranges, and directly return without performing further processing.

Measure 2: Mean Deviation Judgment

In three sliding windows with a length N, respectively calculate standard deviations $\sigma_x$, $\sigma_y$, $\sigma_z$ of the three-axis acceleration data, and calculate mean standard deviation $\sigma$:

$$\sigma=(\sigma_x+\sigma_y+\sigma_z)/3$$

If the mean standard deviation is smaller than a given threshold, take it not as a real human motion to be recognized, and directly return without performing further processing.

Measure 3: State Judgment at an Action Completion Moment

As for a real human motion to be recognized, there is a short pause at the action completion moment. Therefore, it is feasible to judge whether what is represented by the collected original data sequence is a real human motion to be recognized according to this principle.

Specifically, as for the three-axis acceleration data, select a latter predetermined number of data points in each sliding window, respectively find a minimum and a maximum of the latter predetermined number of data points in each axial direction: $MinA_x$, $MaxA_x$, $MinA_y$, $MaxA_y$, $MinA_z$, $MaxA_z$, and calculate a mean fluctuation range MeanRange according to these maximums and minimums:

$$MeanRange=(MaxA_x-MinA_x+MaxA_y-MinA_y+MaxA_z-MinA_z)/3;$$

and calculate respective axial mean values $MeanA_x$, $MeanA_y$, $MeanA_z$ $$MeanA_x=(MinA_x+MaxA_x)/2$$

$$MeanA_y=(MinA_y+MaxA_y)/2$$

$$MeanA_x=(MinA_z+MaxA_z)/2$$

Further calculate a mean value judgment amount MeanA:

$$MeanA=\sqrt{MeanA_x^2+MeanA_y^2+MeanA_z^2}$$

If the mean fluctuation arrange MeanRange<E0, and |MeanA−G|<E1 it is believed that the action completion moment corresponding to a latter predetermined number of data points is in an approximately stationary state, and then it is believed that the data sequence is a valid original data sequence, and subsequent processing is continued; otherwise, believe the latter predetermined number of data points do not correspond to a real human motion to be recognized, and directly return without performing further processing. Wherein G is gravitational acceleration, and E0 and E1 are given thresholds.

Embodiment 4

Figure 5:
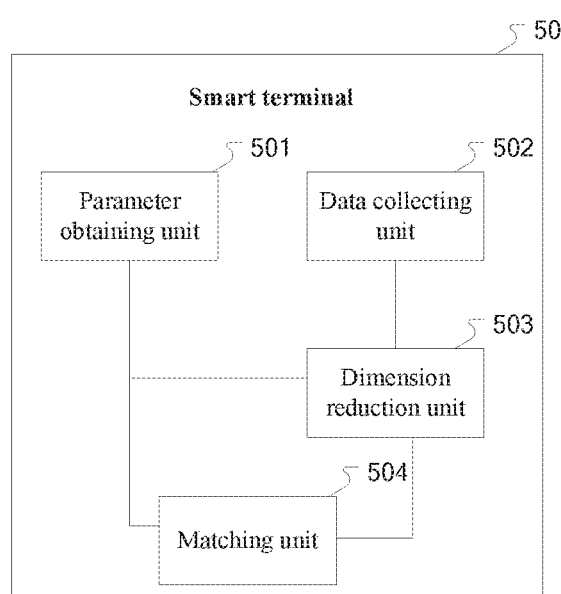
FIG. 5 is a bock diagram of a mobile smart terminal according to an embodiment of the present disclosure.

In addition, embodiments of the present disclosure further provides a smart terminal. FIG. 5 is a block diagram of a smart terminal according to an embodiment of the present disclosure. Referring to FIG. 5, the smart terminal 50 comprises: a parameter obtaining unit 501, a data collecting unit 502, a dimension reduction unit 503 and a matching unit 504;

The parameter obtaining unit 501 is configured to obtain a feature extraction parameter and a template data sequence.

The parameter obtaining unit 501 may be configured to obtain the feature extraction parameter and template data sequence from information input by an external device, or a template training module may be disposed in the parameter obtaining unit 501, and the template training module collects human motion data to train to obtain the feature extraction parameter and the template data sequence, and output the feature extraction parameter and template data sequence to the parameter obtaining unit 501.

The data collecting unit 502 is configured to collect data needed for performing human motion recognition to obtain an original data sequence;

The dimension reduction unit 503 is configured to use the feature extraction parameter obtained by the parameter obtaining unit 501 to perform feature extraction on the original data sequence, reduce the number of data dimensions of the original data sequence, and obtain a test data sequence after the dimension reduction;

The matching unit 504 is configured to match the test data sequence with the template data sequence obtained by the parameter obtaining unit 501, and confirm that a human motion corresponding to the template data sequence associated with the test data sequence occurs when a successfully-matched test data sequence exists.

In an embodiment of the present disclosure, a template training module is disposed in the parameter obtaining unit 501.

The template training module is configured to collect data for multiple times for the same human motion to obtain a plurality of training data sequences; use principal components analysis to perform feature extraction on each training data sequence, reduce the number of data dimensions of the training data sequence, obtain a training data sequence after dimension reduction, and determine a template data sequence corresponding to the human motion according to distances between training data sequences after the dimension reduction.

In an embodiment of the present disclosure, the data collecting unit 502 is configured to use a sensor to collect three-axis acceleration data and/or three-axis angular speed data, and store the collected three-axis acceleration data and/or three-axis angular speed data respectively in a corresponding annular buffer area; perform sampling simultaneously from the annular buffer areas according to a predetermined frequency, and perform window-adding processing on the sampled data with a sliding widow with a predetermined step, to obtain an original data sequence with a predetermined length.

In an embodiment of the present disclosure, the smart terminal 50 further comprises a filtering unit configured to perform filter processing on the original data sequence with a predetermined length to filter out interference noise.

In an embodiment of the present disclosure, the filtering unit is specifically configured to perform filter processing on a data point in each axial direction of the original data sequence having the predetermined length, select a predetermined number of data points adjacent to a left side of the data point and select a predetermined number of data points adjacent to a right side of the data point, and calculate an average value of selected data points, and replace a value of the data point to be filter-processed with the average value.

In an embodiment of the present disclosure, the template training module is specifically configured to: filter each collected training data sequence, and perform normalization processing on the training data sequence after the filtering; calculate all feature values of a covariance matrix of the training data sequence and a unit feature vector corresponding to each feature value; select an optimal feature value from feature values; perform dimension reduction processing on the training data sequence by using a conversion matrix constituted by a unit feature vector corresponding to the optimal feature value, calculate mapping of the training data sequence on the conversion matrix, and obtain the training data sequence after dimension reduction; respectively calculate distances between each training data sequence and other training data sequence after dimension reductions, average all distances of each training data sequence, select a minimum value from the average distances obtained from each training data sequence, and take the training data sequence where the minimum value lies as a template data sequence corresponding to the human motion.

In an embodiment of the present disclosure, the feature extraction parameters comprises: each axial mean value and a standard deviation vector of the training data sequence corresponding to the template data sequence, and a conversion matrix for performing data dimension reduction.

The dimension reduction unit 503 is specifically configured to: use respective axial mean values and standard deviation vector of the training data sequence to perform normalization processing on the original data sequence after the filter processing; use the conversion matrix to perform feature extraction on the original data sequence after the normalization processing, reduce the number of data dimensions of the original data sequence and obtain test data sequence after dimension reduction.

In an embodiment of the present disclosure, the matching unit 504 is specifically configured to: calculate a distance between the template data sequence and the test data sequence through the following formula:

$$DIST(D, A) = \sqrt{\sum_{i=1}^{N} (d_i - a_i)^2}$$

Wherein, A is the template data sequence, $a_i$ represents the $i^{th}$ element in the template data sequence, D is the test data sequence, $d_i$ represents the $i^{th}$ element in the test data sequence, N is a length of the template data sequence and a length of the test data sequence, and DIST(D,A) represents calculation of a distance between D and A.

After the distance between the template data sequence and the test data sequence is obtained, the distance is compared with a predetermined threshold; if the distance is smaller than a predetermined threshold, the matching is successful and it is confirmed that the human motion corresponding to the template data sequence associated with the test data sequence occurs.

In an embodiment of the present disclosure, the smart terminal further comprises a screening unit configured to perform screening on the collected original data sequence, and after a valid original data sequence is screened, to perform feature extraction on the valid original data sequence using the feature extraction parameter obtained from the training.

Reference may be made to relevant content in the method embodiments of the present disclosure for specific operation manners of units in the product embodiment of the present disclosure, and no detailed depictions are presented any more here.

As known from the above, according to the human motion recognition scheme provided by the embodiment of the present disclosure, the feature extraction parameter and template data sequence are obtained through pre-training, and the feature extraction parameter is used to perform dimension reduction for the test data sequence, for example, reduce the original three-dimensional acceleration signal to one dimension. As compared with a solution of directly operating on the three-dimensional data in the prior art, the solution in the present disclosure greatly reduces the computing complexity; furthermore, since the three-dimensional data is converted into one-dimensional data, the solution of the present disclosure can cancel noise, reduce requirements for equipment postures when the user sends a gesture instruction, and permit the user to execute the gesture action more flexibly. Experiments prove that the solution of the present embodiment, as compared with the prior art, can accurately recognize the user's human motions such as hand lift and wrist turning, exhibit a high recognition precision, does not impose rigid requirements for the user action posture and a position of a starting point so that the action can be executed more casually, and substantially improves the user's experience.

In addition, the smart terminal provided by the embodiment of the present disclosure comprises but is not limited to smart watch, smart wristband, mobile phone and the like. During the human motion recognition, the computing amount is smaller, the power consumption is lower, and recognition may be run and detected in real time in the smart terminal device, thereby better satisfying needs in practical application, and improving the competitiveness of the smart terminal according to the embodiment of the present disclosure.

In addition, the embodiment of the present disclosure further provides a method for recognizing a user action and a smart terminal belonging to the same inventive concept as the method for recognizing a user action. The method for recognizing a user action will be described in detail through Embodiment 5.

Embodiment 5

Figure 6:
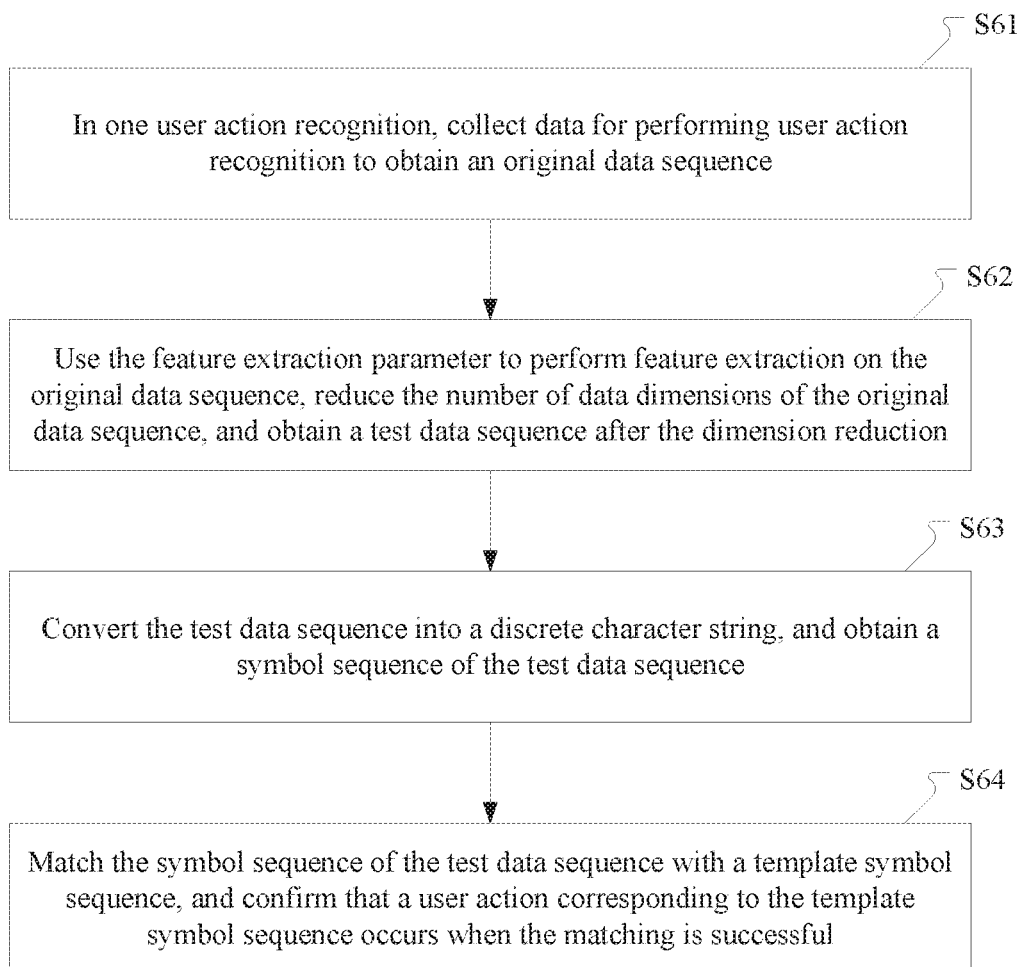
FIG. 6 is a flow chart of a method for recognizing a user action according to an embodiment of the present disclosure.

FIG. 6 is a flow chart of a method for recognizing a user action according to an embodiment of the present disclosure. The method for recognizing a user action comprises: obtaining user action data, training the user action data and obtaining a feature extraction parameter and a template symbol sequence, and further comprises the following steps S61-S64, as shown in FIG. 6.

Step S61: in one user action recognition, collecting data for performing user action recognition to obtain an original data sequence;

Prior to performing the user action recognition, the present embodiment further comprises a template training procedure in which user action data is collected for training to obtain a feature extraction parameter and a template data sequence. The template training procedure is not a requisite operation before performing the user action recognition each time, for example, it is feasible to, before performing all user action recognition, obtain the feature extraction parameter and template data sequence through one template training procedure and use them in all subsequent user action recognition.

Step S62: using the feature extraction parameter to perform feature extraction on the original data sequence, reducing the number of data dimensions of the original data sequence, and obtaining a test data sequence after the dimension reduction;

Step S63: converting the test data sequence into a discrete character string, and obtaining a symbol sequence of the test data sequence;

Step S64: matching the symbol sequence of the test data sequence with the template symbol sequence, and confirming that a user action corresponding to the template symbol sequence occurs when the matching is successful.

According to the method shown in FIG. 6, data needed for performing user action recognition is collected, the feature extraction parameter is used to perform data dimension reduction, the data after the dimension reduction is converted into a discrete character string to obtain the symbol sequence corresponding to the test data sequence, the symbol sequence is matched with the template symbol sequence, and the user action associated with the template symbol sequence is confirmed to occur if the matching is successful. As known from the above, it is possible to reduce the complexity of the user action recognition algorithm and smooth the noise by using the feature extraction parameter to perform data dimension reduction, for example, reducing the high-dimensional three-axis acceleration data to one-dimensional data. The obtained low-dimensional test data sequence is symbolized and converted into a discrete character string, which can further cancel noise, reduce the computing complexity, improve the accuracy of user action recognition, provide the user with unnecessity of executing actions rigidly according to a predetermined trajectory (e.g., an action starting point), and improve the user's experience in use.

Embodiment 6

The present embodiment focuses on illustration of the flow of the method for recognizing a user action, and reference may be made to other embodiments for other content.

Figure 7:
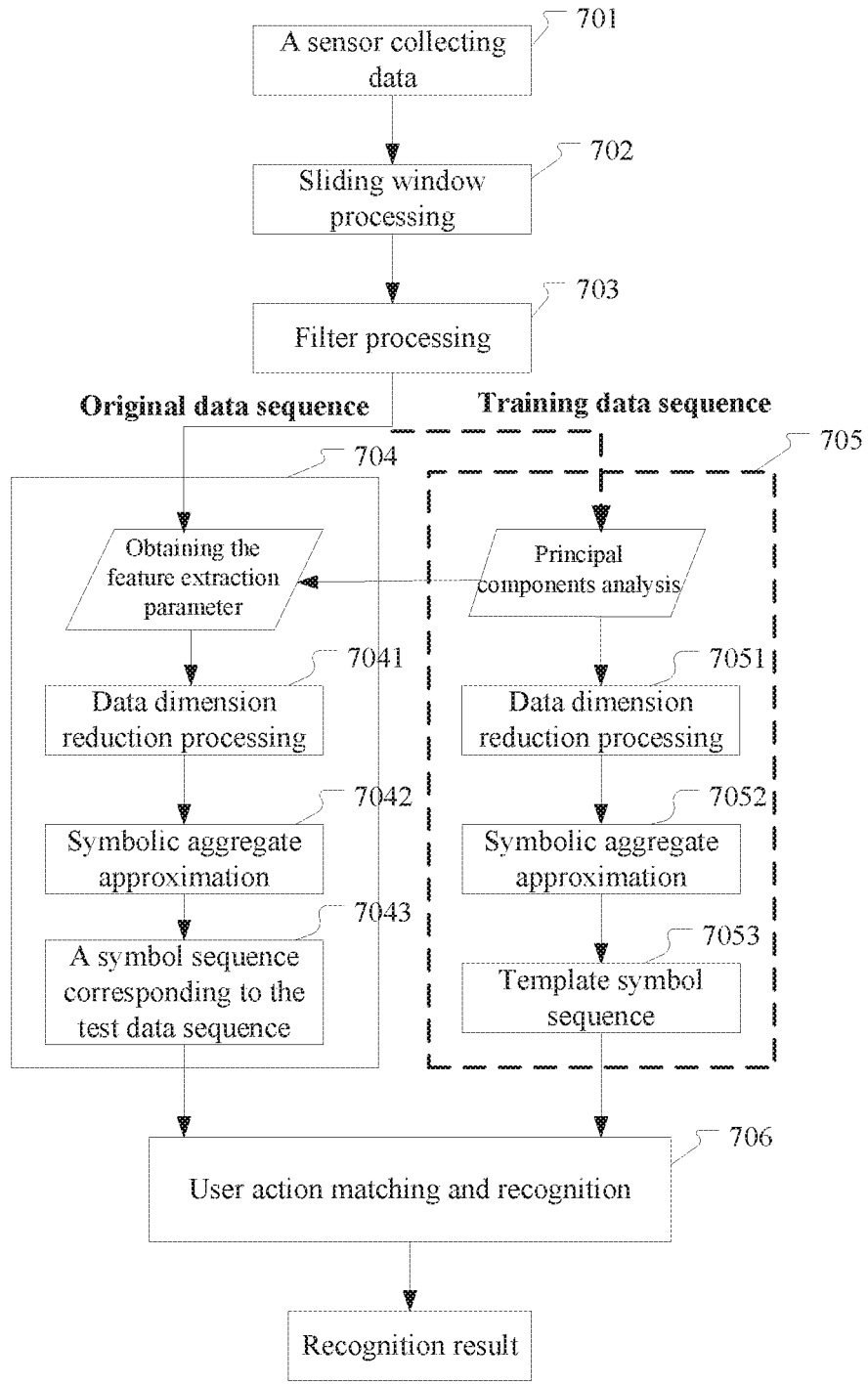
FIG. 7 is a flow chart of a method for recognizing a user action according to a further embodiment of the present disclosure.

FIG. 7 is a flow chart of a method for recognizing a user action according to a further embodiment of the present disclosure. Referring to FIG. 7, in the present embodiment, pre-training is performed to obtain one or more template symbol sequences, each template symbol sequence corresponds to a user action (e.g., one template symbol sequence corresponds to the user's action of lifting a hand, and another template symbol sequence corresponds to the user's action of turning wrist), the template symbol sequence is stored, and the template symbol sequence may be used in subsequent test without need to train again.

Referring to FIG. 7, the template training comprises the following steps: a sensor collecting data; sliding window processing; filtering processing; step 705: training data sequence processing (specifically comprising step 7051 of using principal components analysis to perform data dimension reduction processing on the training data sequence, step 7052 of symbolic aggregate approximation and step 7053 of obtaining the template symbol sequence).

The testing procedure comprises the following steps: step 701: a sensor collecting data; step 702: sliding window processing; step 703: filter processing; step 704: original data sequence processing (specifically comprising step 7041 of performing data dimension reduction processing on the original data sequence by using a feature extraction parameter obtained from the principal components analysis, step 7042 of symbolic aggregate approximation; step 7043 of obtaining the symbol sequence corresponding to the test data sequence), and step 706: performing user action matching and recognition.

It needs to be appreciated that the sensor collecting the data, sliding window processing and the filter processing in the template training respectively correspond to step 701, step 702 and step 703 in the testing procedure, and any pair thereof are performed with substantially the same operation, so FIG. 7 simultaneously shows step 704 and step 705 to clearly illustrate the two procedures: template training and user action recognition.

The flow of such method for recognizing a user action according to an embodiment of the present disclosure is illustrated below by taking one time of user action recognition as an example.

Referring to FIG. 7, the one time of user action recognition procedure according to the present embodiment comprises:

Step 701: a sensor collecting data;

Use the sensor to collect three-axis acceleration data and/or three-axis angular speed data, and store the collected three-axis acceleration data and/or three-axis angular speed data respectively in a corresponding annular buffer area;

The sensor here may be a three-axis acceleration sensor or three-axis gyro sensor.

It needs to be appreciated that the step of the sensor collecting data upon template training is substantially identical with the step of the sensor collecting data during user action recognition procedure, and a main difference lies in that data needs to be collected for multiple times for the same user action upon template training, whereas data of any one user action that actually happens is collected when the user action recognition is executed. Hence, the sensor collecting data during template training can refer to the above related depictions, which will not be detailed here.

In addition, the procedure of sensor collecting data in step 701 in the present embodiment is identical with the aforesaid implementation procedure of sensor collecting data in step 201 in Embodiment 2, so reference may be made to relevant depictions in the aforesaid Embodiment 2 for more content about sensor collecting data, which will be detailed any more here.

Step 702: sliding widow processing;

After the three-axis acceleration data is collected, a sliding window is added respectively to the three-axis acceleration data retrieved from three annular buffer areas. Sampling is performed simultaneously from the annular buffer areas according to a predetermined frequency, and window-adding processing is performed on the sampled data with a sliding widow with a predetermined step to obtain an original data sequence with a predetermined length.

As shown in FIG. 4, sampling is performed according to a predetermined frequency from the annular buffer areas of X-axis, Y-axis and Z-axis three-axis acceleration data, and window-adding processing is performed on the sampled data. Noticeably, the procedure of window-adding processing in step 702 in the present embodiment is identical with the aforesaid implementation procedure of window-adding processing in step 202 in Embodiment 2, thus more contents about window-adding processing can refer to relevant descriptions in aforesaid Embodiment 2, which will not be detailed any more here.

In addition, the sliding window processing procedure upon template training is substantially identical with the sliding window processing step 702 in one time of user action recognition, so reference may be made to the aforesaid relevant depictions for the sliding window processing during the template training.

Step 703: filter processing;

Perform filter processing on an original data sequence obtained after the window is added and having a predetermined length, to filter out interference noise.

In the present embodiment, the performing filter processing on the original data sequence having a predetermined length to filter out interference noise comprises: for a data point to be filtered in each axial direction of the original data sequence having the predetermined length, selecting a predetermined number of data points adjacent to a left side of the data point and selecting a predetermined number of data points adjacent to a right side of the data point, and calculating an average value of selected data points, and replacing a value of the data point to be filtered with the average value.

It needs to be appreciated that the procedure of filter processing in step 703 in the present embodiment is identical with the implementation procedure of filter processing in step 203 in the aforesaid Embodiment 2, so reference may be made to step 203 in aforesaid Embodiment 2 for more content about the filter processing, which will not be detailed any more.

In addition, the filter processing procedure upon template training is identical with the procedure of filter processing step 703 in one time of user action recognition, so reference may be made to relevant depictions in Embodiment 2 for the filter processing procedure during the template training.

Step 704: processing the original data sequence (specifically comprising: obtaining a feature extraction feature; step 7041 of performing data dimension reduction processing;

step 7042: symbolic aggregate approximation; step 7043: obtaining a symbol sequence corresponding to the text data sequence). They are respectively illustrated as follows:

Step 7041: data dimension reduction processing

The feature extraction parameter in step 7041 of performing data dimension reduction processing in the present embodiment is obtained by using the principal components analysis to train the training data sequence in step 705 during template training procedure.

Reference may be made to relevant depictions in Embodiment 2 for the principle of principal components analysis PCA and the calculating procedure, which will not be detailed any more here.

After the feature extraction parameter is obtained from the principal components analysis in step 705, step 7051 is executed. Specifically, step 7051 involves performing dimension reduction processing on the training data sequence by using a conversion matrix constituted by a unit feature vector corresponding to an optimal feature value, and calculating mapping of the training data sequence on the conversion matrix, to obtain the training data sequence after dimension reduction. Noticeably, the procedure of step 7051 in the present embodiment is identical with the procedure for implementing step 2051 data dimension reduction processing in the aforesaid Embodiment 2, and reference may be made to depictions in step 2051 in the aforesaid Embodiment 2. No detailed description will be presented here any more.

During training, as for each training data sequence, standard deviation vectors and respective axial mean values of the training data sequence, and a unit feature vector (namely, conversion matrix) corresponding to the optimal feature value may all be calculated through the data dimension reduction processing in step 7051. A set of such parameters are stored so that when the template symbol sequence is determined subsequently, this set of parameters (namely, including: the standard deviation vectors, respective axial means values, and the conversion matrix) of the training data sequence corresponding to the template symbol sequence are output to the step 704 in the testing procedure so that in step 704 this set of parameters may be used to perform data dimension reduction for the original data sequence.

Step 7041: data dimension reduction processing

Use the feature extraction parameters to perform feature extraction for the original data sequence, reduce the number of data dimensions of the original data sequence, and obtain a test data sequence after the dimension reduction. In the present embodiment, the feature extraction parameters comprise: respective axial means values and standard deviation vector of the training data sequence corresponding to a template SAX symbol sequence and a conversion matrix for performing data dimension reduction, and the training data sequence is obtained from the user action data collected upon training, the respective axial means values and standard deviation vector of the training data sequence are used to perform normalization processing for the original data sequence; the conversion matrix is used to perform feature extraction for the original data sequence after the normalization processing, reduce the number of data dimensions of the original data sequence and obtain test data sequence after dimension reduction.

Specifically, the data dimension reduction processing procedure in step 7041 is substantially identical with the procedure for implementing dimension reduction processing in step 2041 in the aforesaid Embodiment 2, and reference may be made to depictions in step 2041 in the aforesaid Embodiment 2. No detailed description will be presented here any more.

In the present embodiment, after one-dimensional test data sequence corresponding to the original data sequence is obtained, one-dimensional data after the dimension reduction may be regarded as a test data sequence. Or, furthermore, the one-dimensional data sequence is framed, an average value of each frame is solved, and then the data sequence formed by the average value of each frame is regarded as one test data sequence. The so doing can further cancel noise.

As compared with the prior art, the embodiment of the present disclosure uses the principal components analysis PCA to reduce the original acceleration data sequence to one dimension, whereas conventional methods substantially all involve operating on three-dimensional data respectively. Hence, the embodiment greatly reduces the computing complexity; furthermore, a portion of noise may be cancelled by selecting the most important primary components and abandoning secondary components; in addition, since the three-dimensional data is reduced to one-dimensional data, requirements for equipment postures when the user executes operations may be lowered so that the user may execute actions randomly and the user's experience in use is improved.

After one-dimensional test data sequence is obtained, symbolic aggregate approximation SAX is used to convert the test data sequence into a discrete character string. It needs to be appreciated that SAX symbolization procedure of the test data sequence is identical with SAX symbolization procedure when the template is trained. After one-dimensional test data sequence is obtained, how to use symbolic aggregate approximation SAX to convert the test data sequence into a discrete character string will be described in step 7042.

Step 7042: symbolic aggregate approximation;

In step 7041, one-dimensional test data sequence may be obtained by calculation by using the feature extraction parameter obtained during training, to perform dimension reduction processing on the original data sequence;

In the present embodiment, to further cancel noise, it is necessary to perform symbolic aggregate approximation on the data in the one-dimension test data sequence, namely, execute step 7042.

The symbolic aggregate approximate is an effective time sequence data discretization method proposed on the basis of Piecewise Aggregate Approximation (PAA), and uses intrinsic statistics law in a time sequence to convert continuous data into a symbolic sequence (namely, a character string). It can reduce the number of dimensions and perform corresponding similarity metrics. In the present embodiment, the PAA is employed to reduce the number of dimensions for the training data sequence, and the training data sequence is discretized on this basis to implement an effect of using symbols to represent a numerical value sequence and measuring similarity between time sequences.

Through symbolic aggregate approximation SAX, a time sequence with a length N is converted into a SAX word with a length W. The SAX method has a higher compression rate while retaining data partial information, and has a higher bearing capability for noise. The piecewise procedure achieves noise elimination as well as data smoothing processing.

Specifically, suppose that one-dimension acceleration original data sequence obtained in step 7041 is $A=a_1, a_2, \ldots, a_N$, and N is a sequence length. For example, N=50 in the present embodiment;

The symbolic aggregate approximation SAX procedure comprises the following steps ① to ②:

① Performing PAA processing to obtain a PAA sequence with a length W;

A test data sequence with a length N is converted into a piecewise aggregate approximation PAA sequence with a length W; wherein the value of W is smaller than N;

The acceleration test data sequence A with a length N may be represented by a vector $\overline{A}=\overline{a}_1, \overline{a}_2, \ldots, \overline{a}_W$ of a W-dimensional space, wherein the ith element of $\overline{A}$ is calculated as follows:

$$\overline{a}_i = \frac{W}{N} \sum_{j=\frac{N}{W}(i-1)+1}^{\frac{N}{W}i} a_j$$

Through PAA processing, the length of the test data sequence is reduced from N to W. W represents a length of one-dimensional test data sequence after the dimension reduction, namely, the number of data included in the test data sequence.

② Discretization

Upon discretization, mapped letter symbols are required to have an equal occurrence probability. Regarding an ordinary time sequence, it approximately abides by Gaussian distribution, so it is feasible to divide a whole range of values of the data sequence into r sections with the equal probability, that is, r portions with an equal area are divided under a Gaussian probability density curve, and the same letter symbol is used to represent a sequence value in the same section to thereby obtain a symbolic representation of the value, wherein a correspondence relationship between a value of the base number r and division of probability space is as shown in Table 1:

TABLE 1

| $\beta_1$ | r | | | | | | | |
|---|---|---|---|---|---|---|---|---|
| | 3 | 4 | 5 | 6 | 7 | 8 | 9 | 10 |
| $\beta_1$ | −0.43 | −0.67 | −0.84 | −0.97 | −1.07 | −1.15 | −1.22 | −1.28 |
| $\beta_2$ | 0.43 | 0 | −0.25 | −0.43 | −0.57 | −0.67 | −0.76 | −0.84 |
| $\beta_3$ | | 0.67 | 0.25 | 0 | −0.18 | −0.32 | −0.43 | −0.52 |
| $\beta_4$ | | | 0.84 | 0.43 | 0.18 | 0 | −0.14 | −0.25 |
| $\beta_5$ | | | | 0.97 | 0.57 | 0.32 | 0.14 | 0 |
| $\beta_6$ | | | | | 1.07 | 0.67 | 0.43 | 0.25 |
| $\beta_7$ | | | | | | 1.15 | 0.76 | 0.52 |
| $\beta_8$ | | | | | | | 1.22 | 0.84 |
| $\beta_9$ | | | | | | | | 1.28 |

Here Table 1 is a breakpoint lookup table when the base number r is from 3 to 10. The base number r represents the number of sections by dividing a time sequence (e.g., test data sequence) when values in the time sequence are distributed roughly evenly; a breakpoint β represents a demarcation point of two sections. The breakpoint may be understood as a data point in a way that data greater than the data point fall within one section, and data smaller than or equal to the data point fall within another section. For example, when the base number r=3, and breakpoint $\beta_1=-0.43$ and $\beta_2=0.43$, a time sequence is divided into three sections, wherein data in the time sequence with a value smaller than the breakpoint $\beta_1$ (namely, −0.43) fall within one section, data with a value greater than or equal to $\beta_1$ and smaller than $\beta_2$ (namely, 0.43) fall into a second section, and data with a value greater than or equal to $\beta_2$ fall within a third section.

According to the foregoing piecewise aggregate approximation (PAA) processing, the test data sequence may be converted into a PAA sequence with a length W, and then the breakpoint in a given SAX letter table is used to build a correspondence relationship between the PAA sequence with a length W and letters in the given SAX letter table, to obtain a discrete SAX symbol sequence formed by letters corresponding to the PAA sequence.

Step 7043: a symbol sequence corresponding to the test data sequence;

Suppose the given SAX sequence letter table is: ALPHABET={a, b, c, d, . . . }. After PAA sequence is obtained, all data (namely, elements) in the PAA sequence is respectively compared with breakpoints of letters in the letter table, an element smaller than a minimum breakpoint is mapped to "a", and an element greater than or equal to a minimum breakpoint and smaller than a second breakpoint is mapped to symbol "b", and so on so forth. All values in the PAA time sequence may be represented by a corresponding letter.

Figure 8:
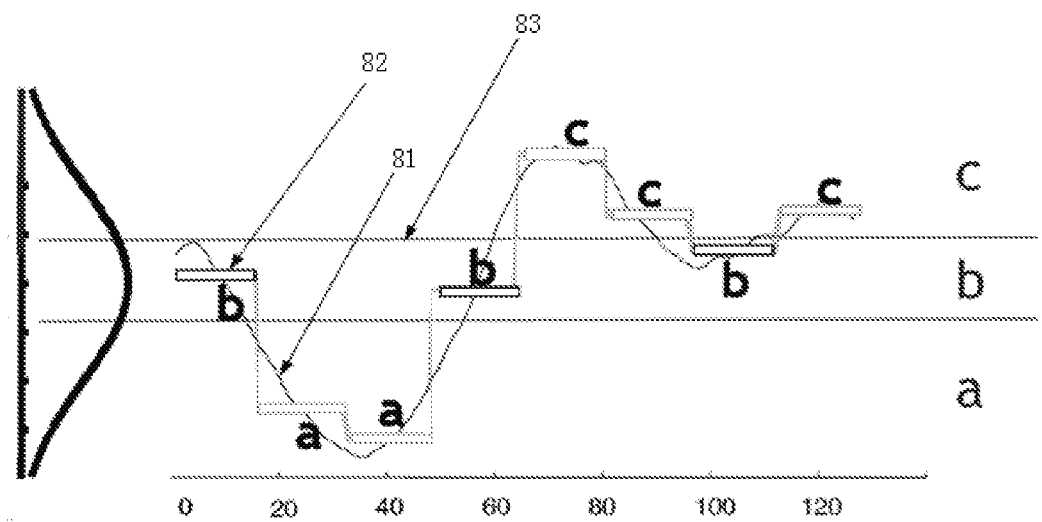
FIG. 8 is a schematic diagram of converting a data sequence into a discrete character string according to an embodiment of the present disclosure.

FIG. 8 is a schematic diagram of converting a data sequence into a discrete character string according to a further embodiment of the present disclosure. Referring to FIG. 8, regarding a test data sequence 81 with a length N, a PAA sequence 82 with a length W is obtained after PAA processing. 83 in FIG. 8 represents a breakpoint for demarcating sections. FIG. 8 shows that two breakpoints demarcate the whole section into three small sections with each small section corresponding to a letter, namely, letters a, b, c. Elements in the PAA sequence are respectively compared with breakpoints, and the SAX symbol sequence corresponding to the PAA sequence in FIG. 8 is: baabccbc.

Suppose $alpha_i$ represents the $i^{th}$ element of the given SAX letter table. In conjunction with the aforesaid given SAX sequence letter table: ALPHABET={a, b, c, d, . . . }, $alpha_1=a$ and $alpha_2=b$, and so on so forth. A mapping formula from PAA sequence $\overline{A}=\overline{a}_1, \overline{a}_2, \ldots, \overline{a}_W$ to the SAX letter sequence is:

$$\hat{a}_i = alpha_j, \text{ if } \beta_{j-1} \le \overline{a}_i < \beta_j$$

Wherein, $\overline{a}_i$ represents the ith element in PAA sequence, $alpha_j$ represents the $j^{th}$ element in the given SAX letter table, $\beta_j$ and is a breakpoint corresponding to the $j^{th}$ element in the given SAX letter table;

Through the above formula, each value in the PAA sequence may be mapped to a letter in the given SAX letter table to thereby obtain the SAX symbol sequence $\hat{A}=\hat{a}_1, \hat{a}_2, \ldots, \hat{a}_W$ corresponding to the test data sequence.

In addition, upon training, on the basis of one-dimensional training data sequence obtained in step 7051, the step 7052 of symbolic aggregate approximation (SAX) is used to convert the one-dimensional training data sequence into the discrete SAX character string to obtain the template symbol sequence in step 7053.

The symbolic aggregate approximation in step 7052 of template training procedure is substantially identical with operation steps of step 7042 symbolic aggregate approximation in one user action test procedure. Hence, reference may be made to the aforesaid depictions for the symbolic aggregate approximation procedure of the training data sequence upon template training, which will not be detailed any more here.

Then, step 7053 template symbol sequence is introduced.

The template symbol sequence is determined in a way of respectively calculating distances between each training SAX symbol sequence and remaining other training SAX symbol sequences after dimension reduction, averaging all distances of each training SAX symbol sequence, selecting a minimum value from the average distances of each training SAX symbol sequence, and taking the training SAX symbol sequence where the minimum value lies as a template SAX symbol sequence corresponding to the user action.

For example, when training the template, the same user action is collected for N times, and N training SAX symbol sequences are obtained after processing, and minimum MINDIST distances between each training SAX symbol sequence and other SAX symbol sequences are calculated using a SAX symbol sequence distance formula, the distances are averaged, and finally, N average MINDIST distances are obtained, and the training SAX symbol sequence where a minimum average MINDIST distance lies is selected as the template SAX symbol sequence of the user action.

Wherein the SAX symbol sequence distance formula for calculating a distance between two SAX symbol sequences is represented as follows:

$$MINDIST(\hat{D}, \hat{A}) = \sqrt{\frac{N}{W}} \cdot \sqrt{\sum_{i=1}^{W}(dist(\hat{d}_i, \hat{a}_i))^2}$$

In the formula, $\hat{D}$ represents a training SAX symbol sequence, $\hat{A}$ represents another training SAX symbol sequence, W represents a length of two training SAX symbol sequences, $\hat{d}_i$ represents the ith element of $\hat{D}$, and $\hat{a}_i$ represents the ith element of $\hat{A}$.

Step 706: user action matching and recognition.

In the present embodiment, the template matching is employed to perform user action recognition. The template matching means matching a symbol sequence corresponding to the test data sequence obtained after the processing with a pre-stored template symbol sequence, and completing a recognition task by measuring similarity (namely, distance) between two symbol sequences. If a distance therebetween is smaller than a given threshold, it is believed that the symbol sequence corresponding to test data sequence successfully matches with the template symbol sequence, and the user action corresponding to the template symbol sequence occurs.

Specifically, suppose a template symbol sequence obtained after the processing of step 7053 is $\hat{D}=\hat{d}_1, \hat{d}_2, \ldots, \hat{d}_W$, and a symbol sequence corresponding to a test sample sequence obtained after the processing of step 7043 is $\hat{A}=\hat{a}_1, \hat{a}_2, \ldots, \hat{a}_W$. The SAX symbol sequence distance formula MINDIST for calculating a distance between two SAX symbol sequences is used to represent the distance between the two SAX symbol sequences.

$$MINDIST(\hat{D}, \hat{A}) = \sqrt{\frac{N}{W}} \cdot \sqrt{\sum_{i=1}^{W}(dist(\hat{d}_i, \hat{a}_i))^2}$$

Wherein, $\hat{A}$ represents a SAX symbol sequence of the test data sequence, $\hat{a}_i$ represents the ith element of the SAX symbol sequence of the test data sequence, $\hat{D}$ represents a template SAX symbol sequence, $\hat{d}_i$ represents the ith element of the template SAX symbol sequence, W represents a length of the template SAX symbol sequence and a length of the SAX symbol sequence of the test data sequence, N is a length of the test data sequence, and dist( ) function represents calculation of a distance;

The dist( ) function is represented as the following formula:

$$dist(r, c) = \begin{cases} 0, & |r-c| \leq 1 \\ \beta_{max(r,c)-1} - \beta_{min(r,c)}, & |r-c| > 1 \end{cases}$$

Wherein r is determined by $\hat{d}_i$, and represent a position index of $\hat{d}_i$ in the given SAX letter table, c is determined by $\hat{a}_i$ and represents a position index of $\hat{a}_i$ in the given SAX letter table; β represents a breakpoint of the given SAX letter table;

It needs to be appreciated that after a size of the SAX letter table is given, a value of dist( ) function may be obtained by looking up SAX letter distance table, wherein SAX letter distance table only needs to be calculated once, and then is stored and looked up quickly upon subsequent use.

TABLE 2

| | a | b | c | d | e | f | g | h |
|---|---|---|---|---|---|---|---|---|
| a | 0 | 0 | 0.48 | 0.83 | 1.15 | 1.47 | 1.82 | 2.30 |
| b | 0 | 0 | 0 | 0.35 | 0.67 | 0.99 | 1.34 | 1.82 |
| c | 0.48 | 0 | 0 | 0 | 0.32 | 0.64 | 0.99 | 1.47 |
| d | 0.83 | 0.35 | 0 | 0 | 0 | 0.32 | 0.67 | 1.15 |
| e | 1.15 | 0.67 | 0.32 | 0 | 0 | 0 | 0.35 | 0.83 |
| f | 1.47 | 0.99 | 0.64 | 0.32 | 0 | 0 | 0 | 0.48 |
| g | 1.82 | 1.34 | 0.99 | 0.67 | 0.35 | 0 | 0 | 0 |
| h | 2.30 | 1.82 | 1.47 | 1.15 | 0.83 | 0.48 | 0 | 0 |

Table 2 schematically shows a SAX letter distance table. Referring to Table 2, r in dist(r,c) represents a row value or column value in Table 2, and c represents a column value or row value in Table 2. For example, r represents a row value, c represents a column value, r=3, and c=5; it is obtained by looking up a value at row 3 column 5 in Table 2 that the distance between letter c and letter e is 0.32, namely, the value of dist(c,e) is 0.32. The letter c is determined by element $\hat{d}_i$ of the SAX symbol sequence of the test data sequence, and letter e is determined by element $\hat{a}_i$ in the template SAX symbol sequence.

By looking up the above Table 2, it is feasible to calculate to obtain a distance between any two letters in two symbol sequences, solve a square root of a sum of squares of all letter distances in two SAX symbol sequences, and calculate to obtain MINDIST.

Certainly, the value of dist(r,c) may also be obtained by calculating through dist( ) function formula. Since the two calculation manners are both based on the same given SAX letter table, the same calculation result is obtained in the two calculation manners. The manners may be selected according to needs in practical application, and will not be limited here.

After the distance MINDIST between the template SAX symbol sequence and the SAX symbol sequence of the test data sequence is obtained, the distance MINDIST is compared with a predetermined threshold. When the distance MINDIST is smaller than a predetermined threshold, the matching is successful, and it is confirmed that the user action corresponding to the template SAX symbol sequence occurs.

A corresponding recognition result may be obtained from step 706 so as to judge whether the collected data sequence corresponds to a valid user action; when it is a user action, which template the user action is matched with may be further recognized.

Emphatically, the present embodiment is detailed illustration of one user action recognition procedure in conjunction with FIG. 7. The corresponding steps in the template training procedure are introduced incidentally while the test procedure is described specifically. However, it may be understood that upon specific implementation, the embodiment of the present disclosure may first, in the order of execution of the sensor collecting data→sliding window processing→filter processing→step 705, obtain the template symbol sequence corresponding to a user action and the feature extraction parameter of the training data sequence corresponding to the template symbol sequence, and then store the feature extraction parameter and template symbol sequence for reuse upon subsequent and actual execution of user action recognition.

Embodiment 7

According to a further embodiment of the present disclosure, after the original data sequence is collected and before performing data dimension reduction processing for the original data sequence, the present embodiment further comprises an operation of screening the original data sequence. Hereunder, emphasis is placed on how to screen the original data sequence. Reference may be made to depictions of other embodiments for undetailed matters of the present embodiment. Specifically, one or more type of the following measures are taken to ensure what is recognized is a real user action to be recognized and minimize a mistrigger rate.

Measure 1: Mean Value Judgment

Such mistrigger-preventing measure is based on the following principle: for a real user action to be recognized, respective axial mean values of the three-axis acceleration data have respective possible ranges of values; if the respective axial mean values obtained from calculation go beyond preset possible ranges of values, the user action may be judged not as the real user action to be recognized, but mistrigger.

It is feasible to respectively calculate a mean value of all data in each axial direction of the original data sequence with a predetermined length or a mean value of a predetermined number of data at an end of data in each axial direction, judge whether the mean values fall within the corresponding predetermined range of mean values, and if yes, determine that the original data sequence is a valid original data sequence.

Such mistrigger-preventing measure comprises two specific implementation modes. Reference may be made to relevant depictions in the aforesaid Embodiment 3 for the two specific implementation modes here, and no detailed description is provided any more here.

Measure 2: Mean Deviation Judgment

It is feasible to respectively calculate a standard deviation of all data in each axial direction of the original data sequence with a predetermined length, calculate from the standard deviations to obtain a mean standard deviation, judge whether the mean standard deviation is smaller than a predetermined mean standard deviation threshold, and if yes, determine that the original data sequence is a valid original data sequence;

Reference may be made to relevant depictions in the aforesaid Embodiment 3 for the specific mode of judging the mean standard deviation, and no detailed description is provided any more here.

Measure 3: State Judgment at an Action Completion Moment

As for a real user action to be recognized, there is a short pause at the action completion moment. Therefore, it is feasible to judge whether what is represented by the collected original data sequence is a user action according to this principle.

It is feasible to select a predetermined number of data at the end of data in each axial direction of the original data sequence with a predetermined length to calculate, judge whether the action completion moment corresponding to the predetermined number of data at the end of data is in a stationary state, and if yes, determine that the original data sequence is a valid original data sequence;

Specifically, it is feasible to respectively select a maximum and a minimum in the predetermined number of data at the end of data in each axial direction of the original data sequence, and according to the maximum and minimum, calculate a mean fluctuation range of data at the action completion moment, as well as each axial mean value; according to each axial mean value, calculate a square root of a sum of squares of each axial mean value to obtain a mean value judgment amount; when the mean fluctuation range is smaller than a first predetermined threshold and an absolute value of a difference between the mean value judgment amount and gravitational acceleration is smaller than a second threshold, determine that the action completion moment corresponding to the predetermined number of data at the end of data is in a stationary state.

Reference may be made to relevant depictions in the aforesaid Embodiment 3 for the specific mode of implementing the state judgment of the action completion moment, and no detailed description is provided any more here.

The present embodiment introduces the employed several mistrigger-preventing measures. It can be seen that in the present embodiment, by deeply analyzing intrinsic change law of waveform of the user actions and thereby setting constraint conditions that the user action should satisfy (e.g., a mean value change range of the three-axis acceleration, a possible change range of an action waveform finishing point, and a short pause exists after finishing an action and the like), mistrigger may be suppressed very well, and the probability of mis-recognizing non-user actions into user actions is substantially reduced.

The above illustrates the flow of the method for recognizing a user action one time according to the present embodiment of the present disclosure. As known from the above, as compared with the prior art, first, the method for recognizing a user action according to the present disclosure reduces the original data sequence to one dimension while operation is directly performed on the three-dimensional data in substantially all conventional methods, so the method of the present disclosure greatly reduces the computing complexity; and partial noise may be cancelled by reducing the number of data dimensions; in addition, since the three-dimensional data sequence is converted into one-dimensional data sequence, requirements for equipment postures when the user executes the action may be lowered so that the user may execute the action relatively randomly.

Secondly, with the one-dimensional test data sequence being converted into a character string sequence, the number of data dimensions is further reduced, the computing complexity is reduced, and the user action recognizing effect is ensured. In addition, the matching operation in next step is also simplified using a character string to represent a numerical value sequence.

Thirdly, by deeply analyzing intrinsic change law of waveform of the user actions and thereby setting constraint conditions that the gesture action should satisfy (e.g., a mean value change range of the three-axis acceleration, a possible change range of a gesture waveform finishing point, and a short pause may exist after completion of the gesture and the like), mistrigger may be suppressed very well, and the probability of mis-recognizing the user actions is substantially reduced.

Embodiment 8

Figure 9:
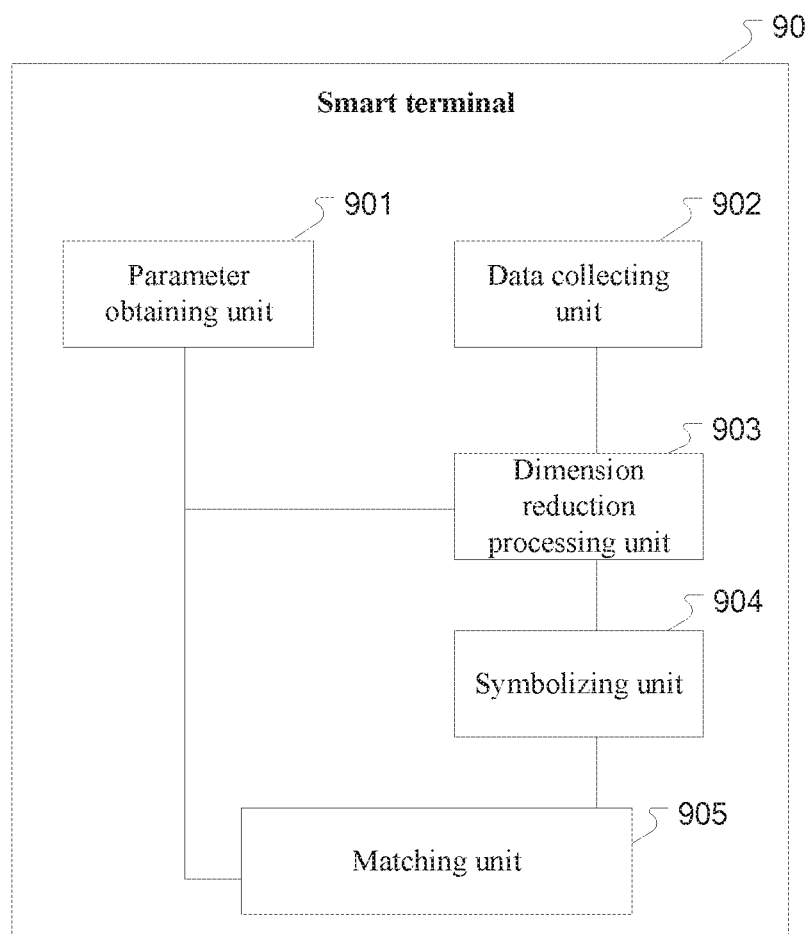
FIG. 9 is a block diagram of a mobile smart terminal according to a further embodiment of the present disclosure.

The present disclosure further provides a smart terminal. FIG. 9 is a block diagram of a smart terminal according to a further embodiment of the present disclosure. Referring to FIG. 9, the smart terminal 90 comprises: a parameter obtaining unit 901, a data collecting unit 902, a dimension reduction processing unit 903, a symbolizing unit 904 and a matching unit 905;

The parameter obtaining unit 901 is configured to obtain a feature extraction parameter and a template symbol sequence; the parameter obtaining unit 901 may be configured to obtain the feature extraction parameter and template symbol sequence from information input by an external device, or a template training module may be disposed in the parameter obtaining unit 901, and the template training module collects human motion data to train to obtain the feature extraction parameter and the template symbol sequence, and output the feature extraction parameter and template symbol sequence to the parameter obtaining unit 901.

The data collecting unit 902 is configured to, in one user action recognition, collect data needed to perform user action recognition to obtain an original data sequence;

The dimension reduction processing unit 903 is configured to use the feature extraction parameter obtained by the parameter obtaining unit 901 to perform feature extraction on the original data sequence, reduce the number of data dimensions of the original data sequence, and obtain a test data sequence after the dimension reduction;

The symbolizing unit 904 is configured to convert the test data sequence into a discrete character string and obtain a symbol sequence of the test data sequence;

The matching unit 905 is configured to match the symbol sequence of the test data sequence with the template symbol sequence obtained by the parameter obtaining unit 901, and confirm that a user action corresponding to the template symbol sequence occurs when the matching is successful.

In an embodiment of the present disclosure, the smart terminal 90 further comprises a mistrigger judging unit;

The mistrigger judging unit is configured to perform screening on the collected original data sequence, and after a valid original data sequence is screened, to trigger the dimension reduction processing unit to perform feature extraction on the valid original data sequence using the feature extraction parameter of the parameter obtaining unit 901;

The mistrigger judging unit is configured to screen the collected original data sequence in the following manner:

respectively calculate a mean value of all data in each axial direction of the original data sequence with a predetermined length or a mean value of a predetermined number of data at an end of data in each axial direction, judge whether the mean values fall within the corresponding predetermined range of mean values, and if yes, determine that the original data sequence is a valid original data sequence;

or, respectively calculate a standard deviation of all data in each axial direction of the original data sequence with a predetermined length, calculate from the standard deviations to obtain a mean standard deviation, judge whether the mean standard deviation is smaller than a predetermined mean standard deviation threshold, and if yes, determine that the original data sequence is a valid original data sequence; or select a predetermined number of data at the end of data in each axial direction of the original data sequence with a predetermined length to calculate, judge whether the action completion moment corresponding to the predetermined number of data at the end of data is in a stationary state, and if yes, determine that the original data sequence is a valid original data sequence.

In the present embodiment, the template symbol sequence is a template SAX symbol sequence obtained using symbolic aggregate approximation SAX upon training the user action data; the symbolizing unit 904 is configured to use the symbolic aggregate approximation identical with the symbolic aggregate approximation SAX upon training the user action data to convert the test data sequence into a discrete SAX character string and obtain an SAX symbol sequence of the test data sequence.

In the present embodiment, a template training module is disposed in the parameter obtaining unit 901 and configured to collect data for multiple times for the same user action to obtain a plurality of training data sequences; use principal components analysis to perform feature extraction on each training data sequence, reduce the number of data dimensions of the training data sequence, and obtain a training data sequence after dimension reduction; use symbolic aggregate approximation SAX to calculate a training SAX symbol sequence of each training data sequence after the dimension reduction, and determine a template SAX symbol sequence corresponding to the user action according to distances between training SAX symbol sequences.

In an embodiment of the present disclosure, the data collecting unit 902 is configured to use a sensor to collect three-axis acceleration data and/or three-axis angular speed data, and store the collected three-axis acceleration data and/or three-axis angular speed data respectively in a corresponding annular buffer area; perform sampling simultaneously from the annular buffer areas according to a predetermined frequency, and perform window-adding processing on the sampled data with a sliding widow with a predetermined step, to obtain an original data sequence with a predetermined length; perform filter processing on the original data sequence with a predetermined length to filter out interference noise;

and a template training module is disposed in the parameter obtaining unit 901 and configured to use principal components analysis to perform feature extraction on each training data sequence, reduce the number of data dimensions of the training data sequence to obtain a training data sequence after dimension reduction; then using symbolic aggregate approximation SAX to calculate a training SAX symbol sequence of each training data sequence after the dimension reduction, and determining a template SAX symbol sequence corresponding to the user action according to distances between training SAX symbol sequences comprises: filtering each collected training data sequence, and performing normalization processing on the training data sequence after the filtering; calculating all feature values of a covariance matrix of the training data sequence and a unit feature vector corresponding to each feature value; selecting an optimal feature value from feature values; performing dimension reduction processing on the training data sequence by using a conversion matrix constituted by a unit feature vector corresponding to the optimal feature value, calculating mapping of the training data sequence on the conversion matrix, and obtaining the training data sequence after dimension reduction; using symbolic aggregate approximation SAX to calculate a training SAX symbol sequence of each training data sequence after the dimension reduction; respectively calculating a distance between each training SAX symbol sequence and remaining other training SAX symbol sequences after dimension reduction, averaging all distances of each training SAX symbol sequence, selecting a minimum value from the average distances of each training SAX symbol sequence, and taking the training SAX symbol sequence where the minimum value lies as a template SAX symbol sequence corresponding to the user action.

In the present embodiment, the feature extraction parameters comprises: respective axial mean values and a standard deviation vector of the training data sequence corresponding to the template SAX symbol sequence, and a conversion matrix for performing data dimension reduction, the training data sequence being obtained from the user action data; the dimension reduction processing unit 903 is specifically configured to: use respective axial mean values and the standard deviation vector of the training data sequence to perform normalization processing on the original data sequence; use the conversion matrix to perform feature extraction on the original data sequence after the normalization processing, reduce the number of data dimensions of the original data sequence and obtain test data sequence after dimension reduction.

In the present embodiment, the symbolizing unit 904 is specifically configured to convert a test data sequence with a length N into a Piecewise Aggregate Approximation (PAA) sequence with a length W; wherein a value of W is smaller than N;

Use a breakpoint in a given SAX letter table to build a correspondence relationship between the PAA sequence with a length W and letters in the given SAX letter table, to obtain a discrete SAX symbol sequence formed by letters corresponding to the PAA sequence.

In the present embodiment, the matching unit 905 is specifically configured to: calculate a distance between the SAX symbol sequence of the test data sequence and the template SAX symbol sequence through the following formula:

$$MINDIST(\hat{D}, \hat{A}) = \sqrt{\frac{N}{W}} \cdot \sqrt{\sum_{i=1}^{W} \left(dist(\hat{d}_i, \hat{a}_i)\right)^2}$$

Wherein, $\hat{A}$ represents a SAX symbol sequence of the test data sequence, $\hat{a}_i$ represents the ith element of the SAX symbol sequence of the test data sequence, $\hat{D}$ represents a template SAX symbol sequence, $\hat{d}_i$ represents the ith element of the template SAX symbol sequence, W represents a length of the template SAX symbol sequence and a length of the SAX symbol sequence of the test data sequence, N is a length of the test data sequence, and dist( ) function represents calculation of a distance;

The dist( ) function is represented as the following formula:

$$dist(r, c) = \left\{ \begin{array}{l} 0, |r - c| \leq 1 \\ \beta_{max(r,c)-1} - \beta_{min(r,c)}, |r - c| > 1 \end{array} \right\}$$

Wherein r is determined by $\hat{d}_i$, c is determined by $\hat{a}_i$; $\beta$ represents a breakpoint of the given SAX letter table;

After the distance between the template SAX symbol sequence and the SAX symbol sequence of the test data sequence is obtained, the distance is compared with a predetermined threshold. When the distance is smaller than the predetermined threshold, the matching is successful, and it is confirmed that the user action corresponding to the template SAX symbol sequence occurs.

Reference may be made to relevant content in the method embodiment 6 of the present disclosure for specific operation manners of units in the smart terminal 90 of the present embodiment, and no detailed depictions are presented any more here.

When the smart terminal 90 in the present embodiment implements the user action recognizing method, first perform data dimension reduction, then convert the data after the dimension reduction into a discrete character string, then match the character string of the test data sequence with the template symbol sequence, and confirm that the user action corresponding to the template symbol sequence occurs when the matching is successful, thereby avoiding the problem with the current smart terminal of directly processing on the three-dimensional data and causing the computing complexity, and meanwhile cancelling partial noise through data dimension reduction, further reducing the computing amount by converting the numerical value into a character string, and improving a recognition precision. In addition, upon performing the user action recognition, the smart terminal further comprises a mistrigger-preventing function, which can further improve accuracy of action recognition, reduce unnecessary power consumption and improve competitiveness of products.

To conclude, according to the user action recognition solution of the present embodiment, the feature extraction parameter obtained from training is used to perform data dimension reduction on the original data sequence to be recognized, for example, reduce the three-axis acceleration or three-axis angular speed data to one dimension, then perform symbolization processing on the test data sequence obtained after dimension reduction, and thereby finally convert multi-dimensional user action data into a character string sequence, and only use the character string sequence to match with the template symbol sequence obtained from the training. As compared with a current solution of respectively performing operation on three-dimensional data, the present solution greatly reduces the computing complexity, converts three-dimensional data into one-dimensional data, lowers requirements for equipment postures when the user sends a gesture instruction, and permits the user to execute the gesture action more flexibly.

Using the symbolization processing to further reduce dimensions of the data sequence and performing similarity measurement further reduces the computing complexity, can ensure further cancellation of noise on the basis of ensuring the matching performance, and improve the accuracy of action recognition. Experiments prove that the user action recognition method according to the present disclosure can accurately detect a user action such as the whole or half of the hand-lifting action and wrist-turning action, and does not impose rigid requirements for postures and a location of a starting point when the user executes the action, provides randomness to execute the action and provides a better user experience.

In addition, the smart terminal provided by the embodiment of the present disclosure comprises but is not limited to smart watch, smart wristband, mobile phone and the like. Since the smart terminal of the present disclosure employs the method for recognizing user action according to the present embodiment of the present disclosure, during the user action recognition, the computing amount is smaller, the power consumption is lower, and operation and recognition can be done in real time, thereby satisfying needs in practical application very well, and improving the user experience and competitiveness of the smart terminal.

What are described above are only preferred embodiments of the present disclosure and not intended to limit the protection scope of the present disclosure. Any modifications, equivalent substitutions and improvements made within the spirit and principle of the present disclosure are all included in the protection scope of the present disclosure.

The invention claimed is:

1. A method for recognizing a human motion, wherein collecting human motion data to train to obtain a feature extraction parameter and a template data sequence, the method further comprising:
   in one human motion recognition, collecting data needed for performing human motion recognition to obtain an original data sequence;
   using the feature extraction parameter to perform feature extraction on the original data sequence, reducing the number of data dimensions of the original data sequence, and obtaining a test data sequence after the dimension reduction;
   matching the test data sequence with the template data sequence, and confirming that a human motion corresponding to the template data sequence associated with the test data sequence occurs when a successfully-matched test data sequence exists;
   wherein the collecting data for performing human motion recognition to obtain an original data sequence comprises:
   using a sensor to collect three-axis acceleration data and/or three-axis angular speed data, and storing the collected three-axis acceleration data and/or three-axis angular speed data respectively in a corresponding annular buffer area;
   performing sampling simultaneously from the annular buffer areas by a predetermined frequency, and performing window-adding processing on the sampled data with a sliding widow with a predetermined step, to obtain an original data sequence with a predetermined length.

2. The method according to claim 1, wherein the collecting human motion data to train to obtain a feature extraction parameter and a template data sequence comprises:
   collecting data for multiple times for a same human motion to obtain a plurality of training data sequences;
   using principal components analysis to perform feature extraction on each training data sequence, reducing the number of data dimensions of the training data sequence, obtaining a training data sequence after dimension reduction, and determining the template data sequence corresponding to the human motion according to distances between training data sequences after the dimension reduction.

3. The method according to claim 2, wherein the using principal components analysis to perform feature extraction on each training data sequence, reducing the number of data dimensions of the training data sequence, and obtaining a training data sequence after dimension reduction comprises:
   filtering each collected training data sequence, and performing normalization processing on the training data sequence after the filtering;
   calculating all feature values of a covariance matrix of the training data sequence and a unit feature vector corresponding to each feature value;
   selecting an optimal feature value from feature values;
   performing dimension reduction processing on the training data sequence by using a conversion matrix constituted by a unit feature vector corresponding to the optimal feature value, calculating mapping of the training data sequence on the conversion matrix, and obtaining the training data sequence after dimension reduction;
   the determining the template data sequence corresponding to the human motion according to distances between training data sequences after the dimension reduction comprises:
   respectively calculating distances between each training data sequence and other training data sequences after dimension reduction, averaging all distances of each training data sequence, selecting a minimum value from the obtained average distances of each training data sequence, and taking the training data sequence where the minimum value lies as a template data sequence corresponding to the human motion.

4. The method according to claim 3, wherein the using the feature extraction parameter to perform feature extraction on the original data sequence, reducing the number of data dimensions of the original data sequence, and obtaining a test data sequence after the dimension reduction comprises:
   the feature extraction parameter comprises: each axial mean value and a standard deviation vector of a training data sequence corresponding to the template data sequence, and a conversion matrix for performing data dimension reduction;
   using each axial mean value and the standard deviation vector of the training data sequence to perform normalization processing on the original data sequence after the filter processing;
   using the conversion matrix to perform feature extraction on the original data sequence after the normalization processing, reducing the number of data dimensions of the original data sequence, and obtaining the test data sequence after dimension reduction.

5. The method according to claim 1,
   further comprising: performing filter processing on the original data sequence with the predetermined length to filter out interference noise.

6. The method according to claim 5, wherein the performing filter processing on the original data sequence with the predetermined length to filter out interference noise comprises:
   for a data point to be filtered in each axial direction of the original data sequence with the predetermined length, selecting a predetermined number of data points adjacent to a left side of the data point and selecting a predetermined number of data points adjacent to a right side of the data point, and calculating an average value of selected data points, and replacing a value of the data point to be filtered with the average value.

7. The method according to claim 1, wherein the matching the test data sequence with the template data sequence, and confirming that a human motion corresponding to the template data sequence associated with the test data sequence occurs when a successfully-matched test data sequence exists comprises:
calculating a distance between the template data sequence and the test data sequence through the following formula:

$$DIST(D, A) = \sqrt{\sum_{i=1}^{N} (d_i - a_i)^2}$$

wherein, A is the template data sequence, $a_i$ represents the $i^{th}$ element in the template data sequence, D is the test data sequence, $d_i$ represents the $i^{th}$ element in the test data sequence, N is a length of the template data sequence and a length of the test data sequence, and DIST(D,A) represents calculation of a distance between D and A;
after the distance between the template data sequence and the test data sequence is obtained, comparing the distance with a predetermined threshold, and if the distance is smaller than the predetermined threshold, confirming that the test data sequence successfully matches with the template data sequence, and the human motion corresponding to the template data sequence associated with the test data sequence occurs.

8. A method for recognizing a user action, wherein obtaining user action data, training the user action data, and obtaining a feature extraction parameter and a template symbol sequence, the method further comprising:
in one user action recognition, collecting data needed for performing user action recognition to obtain an original data sequence;
using the feature extraction parameter to perform feature extraction on the original data sequence, reducing the number of data dimensions of the original data sequence, and obtaining a test data sequence after the dimension reduction;
converting the test data sequence into a discrete character string, and obtaining a symbol sequence of the test data sequence;
matching the symbol sequence of the test data sequence with a template symbol sequence, and confirming that a user action corresponding to the template symbol sequence occurs when the matching is successful;
wherein the template symbol sequence is a template SAX symbol sequence obtained using symbolic aggregate approximation SAX upon training the user action data;
the converting the test data sequence into a discrete character string, and obtaining a symbol sequence of the test data sequence comprises:
using symbolic aggregate approximation identical with the symbolic aggregate approximation SAX upon training the user action data, to convert the test data sequence into a discrete SAX character string, and obtaining an SAX symbol sequence of the test data sequence.

9. The method according to claim 8, wherein
the obtaining user action data, training the user action data, and obtaining the feature extraction parameter and the template symbol sequence comprises:
collecting data for multiple times for the same user action to obtain a plurality of training data sequences;
using principal components analysis to perform feature extraction on each training data sequence, reducing the number of data dimensions of the training data sequence, and obtaining a training data sequence after dimension reduction;
using symbolic aggregate approximation SAX to calculate a training SAX symbol sequence of each training data sequence after the dimension reduction, and determining a template SAX symbol sequence corresponding to the user action according to distances between training SAX symbol sequences.

10. The method according to claim 9, wherein
the using symbolic aggregate approximation SAX to calculate a training SAX symbol sequence of each training data sequence after the dimension reduction, and determining a template SAX symbol sequence corresponding to the user action according to distances between training SAX symbol sequences comprises:
using symbolic aggregate approximation SAX to calculate a training SAX symbol sequence of each training data sequence after the dimension reduction;
respectively calculating distances between each training SAX symbol sequence and other training SAX symbol sequences after dimension reduction, averaging all distances of each training SAX symbol sequence, selecting a minimum value from the average distances of each training SAX symbol sequence, and taking the training SAX symbol sequence where the minimum value lies as a template SAX symbol sequence corresponding to the user action.

11. The method according to claim 10, wherein the matching the symbol sequence of the test data sequence with the template symbol sequence, and confirming that a user action corresponding to the template symbol sequence occurs when the matching is successful comprises:
calculating a distance between the SAX symbol sequence of the test data sequence and the template SAX symbol sequence through the following formula:

$$MINDIST(\hat{D}, \hat{A}) = \sqrt{\frac{N}{W}} \cdot \sqrt{\sum_{i=1}^{W} (dist(\hat{a}_i, \hat{a}_i))^2}$$

wherein, $\hat{A}$ represents a SAX symbol sequence of the test data sequence, $\hat{a}_i$ represents the $i^{th}$ element of the SAX symbol sequence of the test data sequence, $\hat{D}$ represents a template SAX symbol sequence, $\hat{d}_i$ represents the $i^{th}$ element of the template SAX symbol sequence, W represents a length of the template SAX symbol sequence and a length of the SAX symbol sequence of the test data sequence, N is a length of the test data sequence, and dist( ) function represents calculation of a distance;
the dist( ) function is represented as the following formula:

$$dist(r, c) = \begin{cases} 0, & |r - c| \leq 1 \\ \beta_{max(r,c)-1} - \beta_{min(r,c)}, & |r - c| > 1 \end{cases}$$

wherein r is determined by $d_i$, c is determined by $\hat{a}_i$; $\beta$ represents a breakpoint of the given SAX letter table;
after the distance between the template SAX symbol sequence and the SAX symbol sequence of the test data sequence is obtained, comparing the distance with a predetermined threshold, and when the distance is smaller than the predetermined threshold, confirming that the matching is successful and that the user action corresponding to the template SAX symbol sequence occurs.

12. The method according to claim 9, wherein the using symbolic aggregate approximation identical with the symbolic aggregate approximation SAX upon training the user action data, to convert the test data sequence into a discrete SAX character string, and obtain an SAX symbol sequence of the test data sequence comprises:
   converting a test data sequence with a length N into a piecewise aggregate approximation PAA sequence with a length W; wherein a value of W is smaller than N;
   using a breakpoint in a given SAX letter table to build a correspondence relationship between the PAA sequence with a length W and letters in the given SAX letter table, to obtain a discrete SAX symbol sequence formed by letters corresponding to the PAA sequence.

13. The method according to claim 8, wherein before performing feature extraction on the original data sequence using the feature extraction parameter, the method further comprises:
   performing screening on the collected original data sequence, and after a valid original data sequence is screened, performing feature extraction on the valid original data sequence using the feature extraction parameter;
   the performing screening on the collected original data sequence comprises:
   respectively calculating a mean value of all data in each axial direction of the original data sequence with a predetermined length or a mean value of a predetermined number of data at the end of data in each axial direction, judging whether the mean values fall within the corresponding predetermined range of mean values, and if yes, determining that the original data sequence is a valid original data sequence;
   or
   respectively calculating a standard deviation of all data in each axial direction of the original data sequence with a predetermined length, calculating from the standard deviations to obtain a mean standard deviation, judging whether the mean standard deviation is smaller than a predetermined mean standard deviation threshold, and if yes, determining that the original data sequence is a valid original data sequence;
   or
   selecting a predetermined number of data at the end of data in each axial direction of the original data sequence with a predetermined length to calculate, judging whether an action completion moment corresponding to the predetermined number of data at the end of data is in a stationary state, and if yes, determining that the original data sequence is a valid original data sequence;
   the judging whether an action completion moment corresponding to the predetermined number of data at the end of data is in a stationary state comprises:
   respectively selecting a maximum and a minimum in the predetermined number of data at the end of data in each axial direction of the original data sequence, and according to the maximum and minimum, calculating a mean fluctuation range of data at the action completion moment, as well as each axial mean value;
   according to each axial mean value, calculating a square root of a sum of squares of each axial mean value to obtain a mean value judgment amount;
   when the mean fluctuation range is smaller than a first predetermined threshold and an absolute value of a difference between the mean value judgment amount and gravitational acceleration is smaller than a second threshold, determining that the action completion moment corresponding to the predetermined number of data at the end of data is in a stationary state.

14. A smart terminal, wherein, the smart terminal comprises a processor and at least one computer-readable storage medium, the at least one computer-readable storage medium stores computer-executable instructions which, when executed by the processor, cause the processor to perform operations comprising:
   obtaining a feature extraction parameter and a template symbol sequence; in one user action recognition, collecting data needed for performing user action recognition to obtain an original data sequence; using the feature extraction parameter to perform feature extraction on the original data sequence, reducing the number of data dimensions of the original data sequence, and obtaining a test data sequence after the dimension reduction; converting the test data sequence into a discrete character string and obtaining a symbol sequence of the test data sequence; matching the symbol sequence of the test data sequence with a template symbol sequence, and confirming that a user action corresponding to the template symbol sequence occurs when the matching is successful; wherein the collecting data for performing human motion recognition to obtain an original data sequence comprises: using a sensor to collect three-axis acceleration data and/or three-axis angular speed data, and storing the collected three-axis acceleration data and/or three-axis angular speed data respectively in a corresponding annular buffer area; performing sampling simultaneously from the annular buffer areas by a predetermined frequency, and performing window-adding processing on the sampled data with a sliding widow with a predetermined step, to obtain an original data sequence with a predetermined length;
   or,
   obtaining a feature extraction parameter and a template data sequence; in one human motion recognition, collecting data needed for performing human motion recognition to obtain an original data sequence; using the feature extraction parameter to perform feature extraction on the original data sequence, reducing the number of data dimensions of the original data sequence, and obtaining a test data sequence after the dimension reduction; matching the test data sequence with the template data sequence, and confirming that a human motion corresponding to the template data sequence associated with the test data sequence occurs when a successfully-matched test data sequence exists; wherein the template symbol sequence is a template SAX symbol sequence obtained using symbolic aggregate approximation SAX upon training the user action data; the converting the test data sequence into a discrete character string, and obtaining a symbol sequence of the test data sequence comprises: using symbolic aggregate approximation identical with the symbolic aggregate approximation SAX upon training the user action data, to convert the test data sequence into a discrete SAX character string, and obtaining an SAX symbol sequence of the test data sequence.

\* \* \* \* \*